(12) United States Patent
Hung et al.

(10) Patent No.: US 11,473,254 B2
(45) Date of Patent: Oct. 18, 2022

(54) TRAFFIC CONES AND TRAFFIC CONE LANTERNS PLACEMENT AND COLLECTION SYSTEM AND A METHOD

(71) Applicant: Highways Department, the Government of the Hong Kong Special Administrative Region of the People's Republic of China, Hong Kong (HK)

(72) Inventors: Terrie Kwok Chuen Hung, Hong Kong (HK); Ying Luen Au, Hong Kong (HK); Tat Ngong Chan, Hong Kong (HK); Chi Kin Poon, Hong Kong (HK); Wing Fung Yip, Hong Kong (HK); Jia Xu, Hong Kong (HK); Cheuk Ming Yip, Hong Kong (HK)

(73) Assignee: Highways Department, the Government of the Hong Kong Special Administrative Region of the People's Republic of China, Hong Kong (HK)

( * ) Notice: Subject to any disclaimer, the term of this patent is extended or adjusted under 35 U.S.C. 154(b) by 418 days.

(21) Appl. No.: 16/662,002

(22) Filed: Oct. 23, 2019

(65) Prior Publication Data
US 2020/0131725 A1 Apr. 30, 2020

(51) Int. Cl.
*G06T 7/13* (2017.01)
*E01F 9/70* (2016.01)
(Continued)

(52) U.S. Cl.
CPC ............... *E01F 9/70* (2016.02); *B25J 5/007* (2013.01); *B25J 9/1682* (2013.01); *B25J 9/1697* (2013.01);
(Continued)

(58) Field of Classification Search
CPC ........ B25J 9/1689; A01D 34/008; A61G 3/06; A61G 3/062; E01F 9/70; B60P 1/5423;
(Continued)

(56) References Cited

U.S. PATENT DOCUMENTS

2016/0333537 A1* 11/2016 Julien ........................ E01F 9/70
2017/0079201 A1* 3/2017 Jägenstedt .............. B60L 8/003

FOREIGN PATENT DOCUMENTS

| CN | 105648938 A | 6/2016 |
| CN | 106368140 A | 2/2017 |

(Continued)

OTHER PUBLICATIONS

European Search Report for European Patent Application No. 19204941.9 dated Feb. 14, 2020.

*Primary Examiner* — Phuoc H Doan

(57) ABSTRACT

The present disclosure provides a traffic cones and traffic cone lanterns placement and collection system and a method. The system comprises: a vehicle body, on which a loading bay and a storage bay are disposed; an on-vehicle first robot arm, which is used for moving a traffic cone of the loading bay and a traffic cone lantern thereon off the vehicle body, or collect them from outside of the vehicle to the loading bay; an on-vehicle second robot arm, which is used for moving a traffic cone and a traffic cone lantern to and from the loading bay for storage management; at least one object recognition sensor, which is used for capturing the information of a road traffic marking and the information of the objects on the road; and a processing unit, which is used for working out the position of the road traffic marking and the position information of the objects on the road, and controlling the robot arms' motion accordingly to move the traffic cone of the loading bay and the traffic cone lantern thereon outside of the vehicle body, or collect them from (Continued)

outside of the vehicle. The disclosure enables both traffic cones and traffic cone lanterns automatic placement work or automatic collection work.

12 Claims, 19 Drawing Sheets

(51) Int. Cl.
    *G06T 7/73* (2017.01)
    *B25J 5/00* (2006.01)
    *B25J 9/16* (2006.01)
    *B25J 11/00* (2006.01)
    *B60P 1/54* (2006.01)
    *G01S 13/86* (2006.01)
    *G06V 20/56* (2022.01)

(52) U.S. Cl.
    CPC ........... *B25J 11/008* (2013.01); *B60P 1/5423* (2013.01); *B60P 1/5457* (2013.01); *G01S 13/867* (2013.01); *G06T 7/13* (2017.01); *G06T 7/73* (2017.01); *G06V 20/588* (2022.01); *G06T 2207/10024* (2013.01); *G06T 2207/30256* (2013.01)

(58) Field of Classification Search
    CPC ............ B60P 1/5457; G06T 7/73; G06T 7/13; G06K 9/00798
    USPC .......................................... 382/103; 700/228
    See application file for complete search history.

(56) References Cited

FOREIGN PATENT DOCUMENTS

| | | |
|---|---|---|
| CN | 107460836 A | 12/2017 |
| CN | 206721721 U | 12/2017 |
| WO | 2013/068716 A1 | 5/2013 |
| WO | 2018/132748 A1 | 7/2018 |

* cited by examiner

TRAFFIC CONES AND TRAFFIC CONE LANTERNS PLACEMENT AND COLLECTION SYSTEM AND A METHOD

CROSS REFERENCE TO RELATED APPLICATIONS

The present application claims the benefit of Hong Kong patent application No. 18113749.7 filed on Oct. 26, 2018, the contents of which are incorporated herein by reference in their entirety.

TECHNICAL FIELD

The present disclosure relates to the field of automation technology, and in particular to a system and method for placing and collecting traffic cones and traffic cone lanterns.

BACKGROUND

When the number of traffic cones and traffic cone lanterns increases, the difficulty of manual placement and collection will substantially increase. Compared to a machine, there will be a certain deviation for each manual placement. Therefore, manual placement and collection of traffic cones and traffic cone lanterns are not only time-consuming and labour-intensive, but also has a low accuracy which will lead to a decrease in work efficiency and an increase in operating costs. Workers will encounter danger when routinely handling traffic cones and traffic cone lanterns on highways. Taking out from a vehicle, placing and collecting 15 to 30 pounds of traffic cones may result in injury to workers, such as sprain and strain. Moreover, workers working on the road are also exposed to high traffic fatal risks, and therefore the safety of road and roadside workers cannot be guaranteed.

SUMMARY

In view of the above, the present disclosure provides a system and method for placing and collecting traffic cones and traffic cone lanterns to realize automated placement and collection of traffic cones and traffic cone lanterns instead of manual work.

In order to achieve the above object, the present disclosure adopts the following scheme.

According to one aspect, the present disclosure provides a system of placing and collecting traffic cones and traffic cone lanterns, including: a vehicle having thereon a loading bay; a first robot arm mounted at the vehicle for moving a traffic cone or a traffic cone with a traffic cone lantern in the loading bay away from the vehicle, or collecting the traffic cone and traffic cone lantern from the outside of the vehicle to the loading bay; a second robot arm is mounted at the vehicle for moving traffic cones and traffic cone lanterns into and out of the loading bay for storage management; at least one object recognition sensor (camera or radar) disposed on the vehicle for obtaining road traffic marking information and road object information; a processing unit coupled to the robot arms and the at least one object recognition sensor, and configured to control movement of the robot arms according to the detected position of the road traffic marking and the position information of the road object so as to move the traffic cone in the loading bay or the traffic cone with traffic cone lantern to the outside of the vehicle, or collect the traffic cone and the traffic cone lantern from the outside of the vehicle.

According to another aspect, the present disclosure provides a method for placing traffic cones and traffic cone lanterns, including: obtaining an image signal of a road traffic marking; detecting position information of the road traffic marking according to the image signal of the road traffic marking; controlling a first robot arm according to the position information of the road traffic marking; and moving a traffic cone or a traffic cone with a traffic cone lantern in a loading bay in the vehicle to outside of the vehicle.

According to a further aspect, the present disclosure provides a method for collecting traffic cones and traffic cone lanterns, including: obtaining a positioning signal of at least one suspected traffic cone outside the vehicle by scanning; obtaining an image signal of the at least one suspected traffic cone; identifying a traffic cone from the at least one suspected traffic cone according to the image signal of the at least one suspected traffic cone; determining position information and a relative motion parameter of the identified traffic cone according to the positioning signal; and controlling the first robot arm to move the identified traffic cone from the outside of the vehicle to the loading bay on the vehicle according to the position information and the relative motion parameter of the identified traffic cone.

In one embodiment of the present disclosure, a computer readable storage medium having a computer program stored therein. The steps of the methods described in the above embodiments are implemented when the program is executed by a processor.

In one embodiment of the present disclosure, a computer device includes a memory, a processor, and a computer program that is stored in the memory and executable by the processor. The processor implements the steps of the methods described in the above embodiments when the program is executed.

The present disclosure provides a system for placing and collecting traffic cones and traffic cone lanterns, a method for placing traffic cones and traffic cone lanterns, a method for collecting traffic cones and traffic cone lanterns, a computer readable storage medium, and a computer device. It uses at least one object recognition sensor (camera or radar) to assist in detecting the position information of the road traffic marking and the road object. According to the position information of the road traffic marking and the road object, it controls the first robot arm to move the traffic cones on the vehicle and the traffic cone lanterns on the traffic cones away from the vehicle, or collect the traffic cones and the traffic cone lanterns from the outside. It can use robot arms instead of manual labour, and can also place traffic cones and traffic cone lanterns thereon on the road, or collect traffic cones and traffic cone lanterns thereon from the road. This can avoid exposure to road traffic hazards when workers are in the process of placing or collecting traffic cones. Moreover, by means of mounting the first robot arm on the vehicle and having the traffic cones and the traffic cone lanterns thereon in the loading bay, one can place the traffic cones and the traffic cone lanterns thereon in a certain shape while the vehicle is moving, or collect the traffic cones and the traffic cone lanterns thereon while the vehicle is moving. Its accuracy is high and it is suitable for traffic cone works of relatively large quantity.

BRIEF DESCRIPTION OF THE DRAWINGS

In order to more clearly illustrate the embodiments of the present disclosure and the technical solutions in the prior art, the following drawings for describing the embodiments and the prior art are briefly introduced below. Obviously, the following drawings are only some embodiments of the present disclosure. On the premise of not giving inventive effort, those of ordinary skill in the art can also obtain other drawings from these drawings. In the drawings.

DETAILED DESCRIPTION

In order to make the objects, technical solutions and advantages of the embodiments of the present disclosure more clearly, the following embodiments of the present disclosure are further described in detail. Here, the illustrative embodiments of the present disclosure and their description are used to explain the present disclosure and should not be considered as a limitation of the present disclosure.

Figure 1:
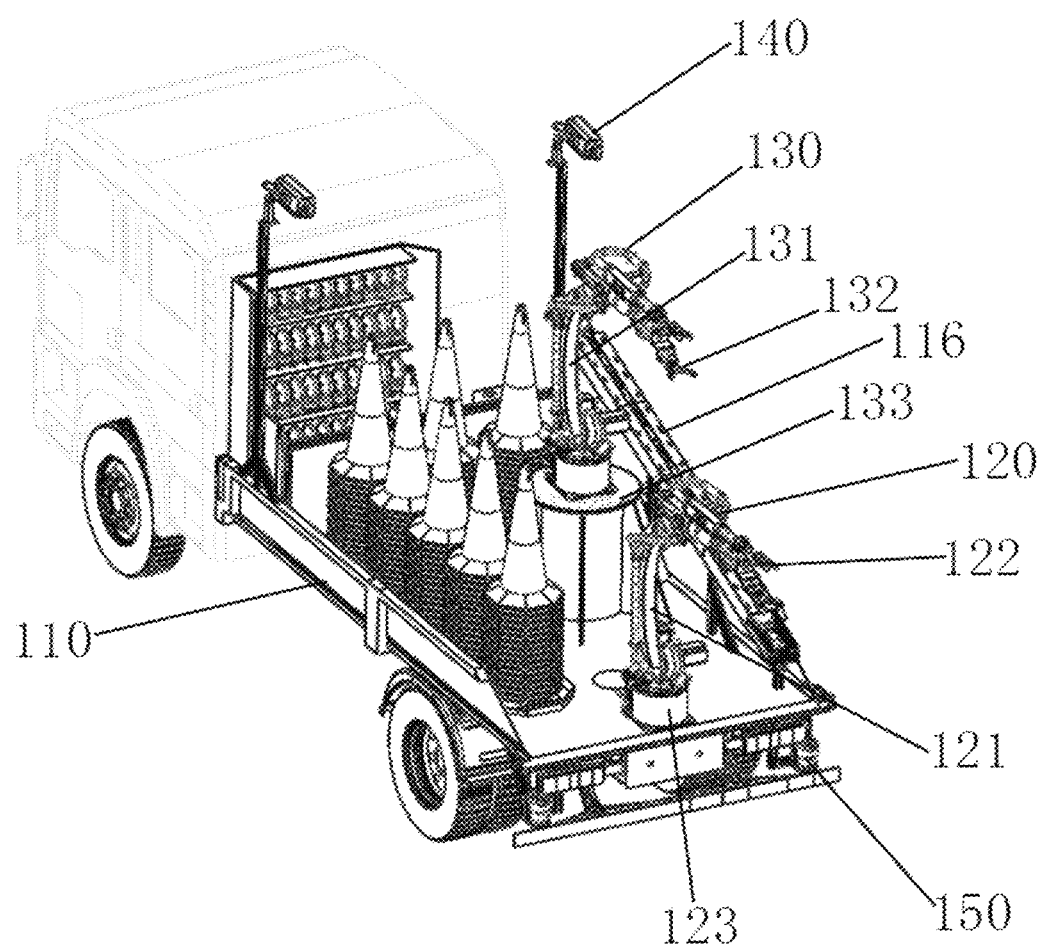
FIG. 1 is a schematic perspective view of the system of placing and collecting traffic cones and traffic cone lanterns according to an embodiment of the present disclosure.
Figure 2:
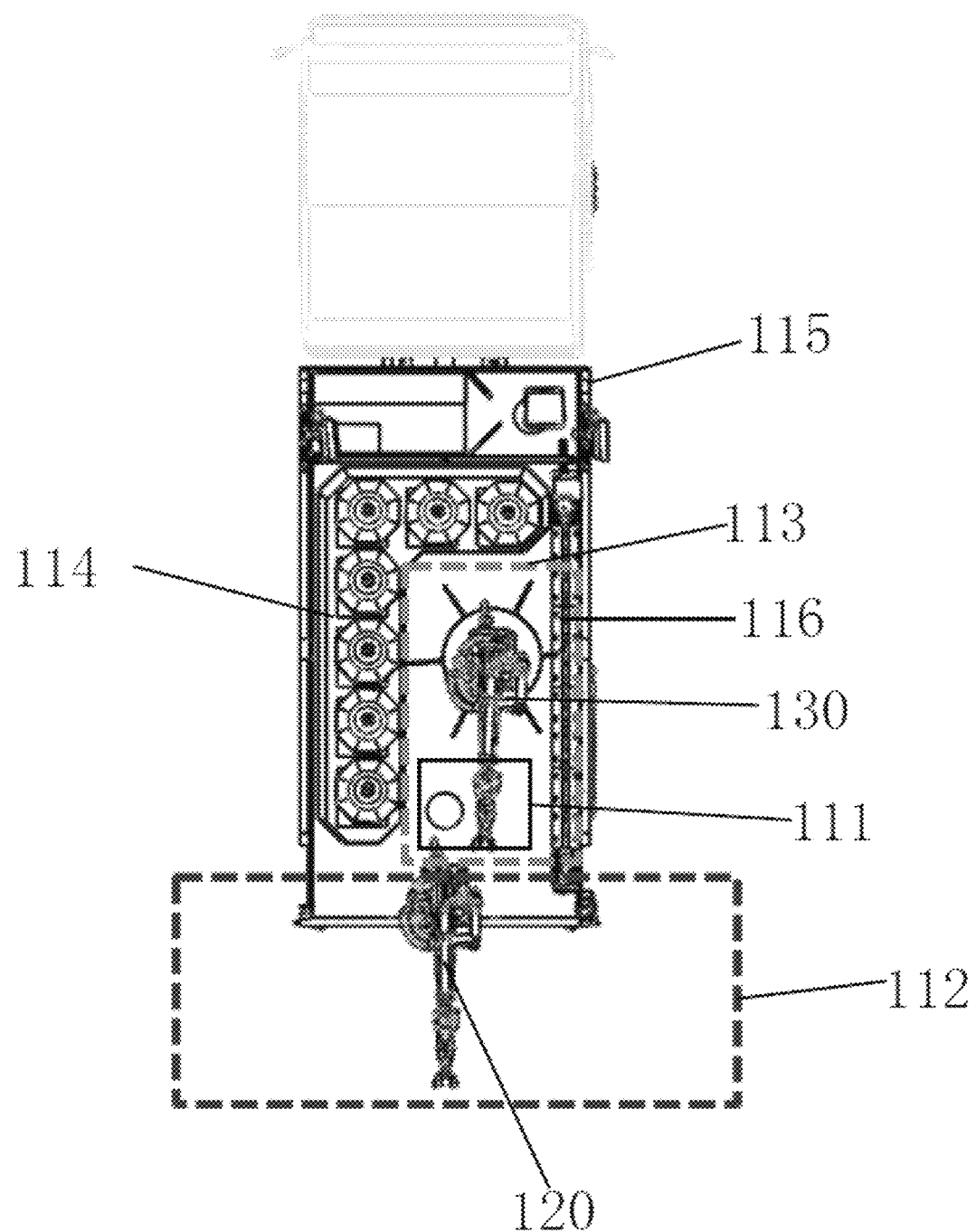
FIG. 2 is a schematic top view of the system of placing and collecting traffic cones and traffic cone lanterns according to an embodiment of the present disclosure.
Figure 3:
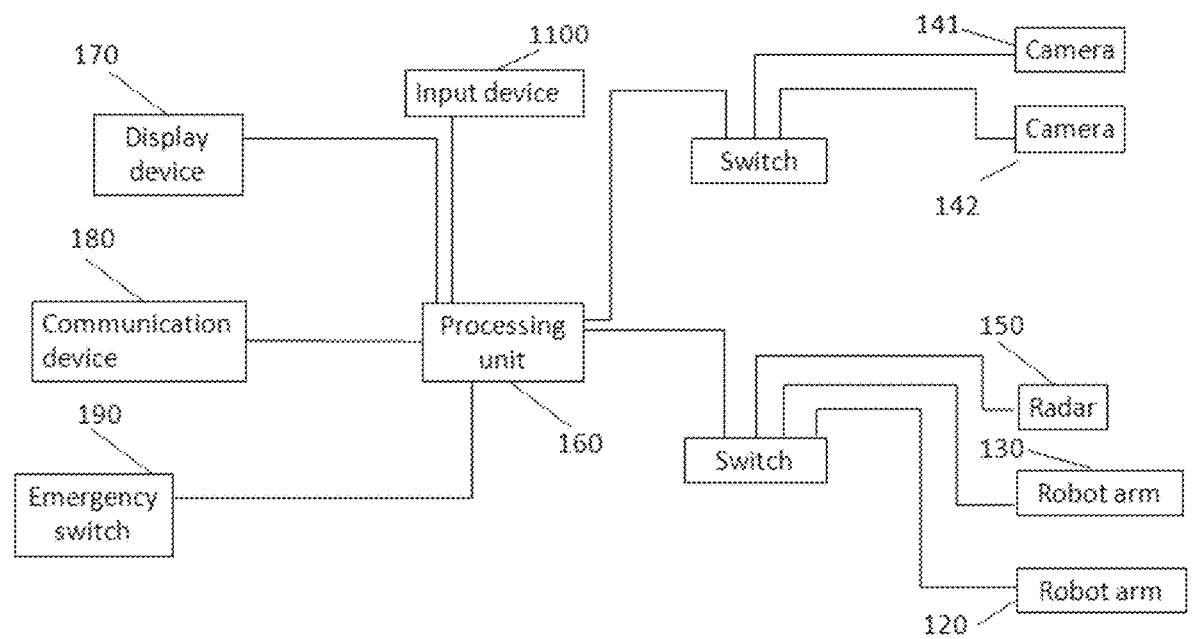
FIG. 3 is a schematic view of the connection relationship of the system of placing and collecting traffic cones and traffic cone lanterns according to an embodiment of the present disclosure.

FIG. 1 is a schematic perspective view of the system of placing and collecting traffic cones and traffic cone lanterns according to an embodiment of the present disclosure. FIG. 2 is a schematic top view of the system of placing and collecting traffic cones and traffic cone lanterns according to an embodiment of the present disclosure. FIG. 3 is a schematic view of the connection relationship of the system of placing and collecting traffic cones and traffic cone lanterns according to an embodiment of the present disclosure.

Referring to FIG. 1 to FIG. 3, the system for placing and collecting traffic cones and traffic cone lanterns according to an embodiment of the present disclosure may include a vehicle 110, a first robot arm 120, at least one camera 140, and a processing unit 160.

A loading bay 111 may be disposed on the vehicle 110. The vehicle 110 can be an autonomous vehicle or a manually driven vehicle. The loading bay 111 can be located adjacent to the first robot arm 120 and can be used for temporarily keeping the traffic cones.

The first robot arm 120 may be mounted at the rear part 112 of the vehicle 110 for moving traffic cones and traffic cone lanterns thereon in the loading bay 111 from the vehicle 110 to a placement position. The rear part 112 is a tail portion relative to a head portion (e.g. a driver cabin) of the vehicle 110. This can facilitate the first robot arm 120 to move the traffic cones in the loading bay 111 from the vehicle 110 to a position on the road surface. The traffic cones without traffic cone lanterns can be stacked in the stacking and storage area 114, or the traffic cones in other locations on the vehicle 110 may be placed in the loading bay 111 by another robot arm, or by a worker on the vehicle 110. The traffic cone lanterns may be placed on the traffic cones in the loading bay 111 by another robot arm, or by a worker on the vehicle 110. The traffic cone lantern may also be placed on a topmost traffic cone to be grabbed in the stacking and storage area 114 first, and then the traffic cone together with the traffic cone lantern can be moved to the loading zone at the same time. Finally, the traffic cone in the loading bay 111 can be moved by the first robot arm 120 from the vehicle 110 to a position on the road surface.

At least one camera 140 may be disposed on the vehicle 110 for obtaining an image signal of the road traffic marking by photographing. The number of cameras 140 may be two (first camera 141 and second camera 142), which may be respectively provided on two sides of the middle, front or rear part of the vehicle 110. The image may be taken from different angles of the object to be identified. The camera 140 may be used to obtain an image signal or image data. For example, it may have a photo-taking function or a video-shooting function, or it may have both photo-taking function and video-shooting function.

The processing unit 160 may be connected to the first robot arm 120 and the at least one camera 140 for detecting position information of the road traffic marking according to an image signal of the road traffic marking, and controlling movement of the first robot arm 120 according to the position information of the road traffic marking in order to move the traffic cones and the traffic cone lanterns thereon in the loading bay 111 to a placement position outside the vehicle 110. The processing unit 160 can be a personal computer, an industrial computer, a processor, a microcontroller, etc., and can be provided on the vehicle 110. The processing unit 160 and the first robot arm 120 can be connected through a switch. The processing unit 160 and the camera 140 can be connected through a switch. The processing unit 160 can identify the road traffic marking (e.g. straight line) by analysing the sideline of the graphics in the image, and can calculate the position information of the road traffic marking relative to the vehicle through comparison between the standard measurement of the road traffic marking and the measurement of the road traffic marking in the image signal. After obtaining the position information of the road traffic marking, the processing unit 160 may sequentially place the traffic cones in the loading bay 111 on the road surface according to a specified arrangement shape, e.g., a straight line, a slanted line, or a curve, etc. The specified arrangement shape can be previously entered into the processing unit 160 in the form of a computer program.

In this embodiment, at least one camera may be used to assist in detecting the position information of the road traffic marking, and control the first robot arm according to the position information of the road traffic marking so as to move the traffic cones and the traffic cone lanterns thereon from the vehicle. It can use robot arms instead of manual labour, and can place traffic cones and traffic cone lanterns thereon on the road. This can avoid exposure to road traffic hazards when workers are placing or collecting traffic cones. Moreover, by means of mounting the first robot arm on the vehicle and having the traffic cones and the traffic cone lanterns thereon in the loading bay, the worker can place the traffic cones and the traffic cone lanterns thereon in a certain shape while the vehicle is moving. Its accuracy is high and it is suitable for traffic cone works of relatively large quantity.

In some embodiments, referring again to FIGS. 1 and 3, the system of placing and collecting traffic cones and traffic cone lanterns may also include a radar 150. The radar 150 can be used to assist the collection of traffic cones on the road. Specifically, the radar 150 may be disposed on the vehicle 110 and may be used for obtaining at least one suspected traffic cone outside the vehicle 110 and its positioning signal by scanning. The radar 150 can be mounted at the side or the middle of the rear part of the vehicle, for example, one on each side. Using the radar 150 to analyse the contour and shape of the scanned object can determine whether the object is a suspected traffic cone. For example, when the contour of an object is analysed to have a conical shape, the object may be considered as a suspected traffic cone. At this time, the at least one camera 140 may be further adapted to obtain an image signal of the at least one suspected traffic cone by photographing. The image signal can be used to further determine whether the suspected traffic cone is indeed a traffic cone. The processing unit 160 may be connected to the radar 150 and may be further configured to identify a traffic cone from the at least one suspected traffic cone according to the image signal of the at least one suspected traffic cone. The position information and a relative motion parameter of the identified traffic cone can be determined according to the positioning signal. The movement of the first robot arm 120 can be controlled according to the position information and the relative motion parameter of the identified traffic cone so as to move the identified traffic cone to the loading bay. The relative motion parameter may be the traffic cone relative to the acceleration rate, deceleration rate, speed, etc. of the vehicle. In this embodiment, the use of the radar can help to detect the positioning signal of the suspected traffic cone on the road, and the use of the camera can further help to determine if the suspected traffic cone on the road is a traffic cone. As such, the identification of traffic cone can be accurate. In the case of identifying the traffic cone on the road, the processing unit may be used to calculate the exact capture time and position so as to control the first robot arm to collect the identified traffic cone to the vehicle. In this way, it is possible to achieve automated collection of traffic cones on the road while the vehicle is moving, thereby further avoiding exposing workers to the danger of road traffic when they are collecting the traffic cones.

In some embodiments, referring again to FIGS. 1 to 3, the system of placing and collecting traffic cones and traffic cone lanterns may further include a second robot arm 130. The second robot arm 130 can be used for managing the traffic cones and the traffic cone lanterns stored on the vehicle 110, or for placing the traffic cone lantern in a traffic cone lantern take-up area of the vehicle on the traffic cone that has been moved to the loading bay.

Specifically, the second robot arm 130 may be mounted at the middle part 113 of the vehicle and may be used for moving the traffic cones in a stacking and storage area 114 on the vehicle 110 to the loading bay 111, or at the same time when the second robot arm 130 moves the traffic cones in the stacking and storage area 114 on the vehicle 110 to the loading bay 111, the second robot arm 130 may also be used to place the traffic cone lantern in the traffic cone lantern take-up area of the vehicle 110 onto the traffic cone that has been moved to the loading bay 111. The middle part 113 can facilitate the second robot arm 130 to move the traffic cones in the stacking and storage area 114 of the vehicle 110 to a position in the loading bay 111. For example, the stacking and storage area 114 may be located between the second robot arm 130 and the first robot arm 120. The stacking and storage area 114 may be located on one side of the second robot arm 130 near a front portion of the head portion of the vehicle 110. The traffic cone lantern take-up area may be located on the other side of the second robot arm 130. The second robot arm 130 may move the traffic cone with the traffic cone lantern mounted thereon in the stacking and storage area 114 to the loading bay 111, or the traffic cone may be moved to the loading bay 111 first, and the traffic cone lantern in the traffic cone lantern take-up area may then be placed on the traffic cone in the loading bay 111. The traffic cone lantern take-up area may be provided with a support device, such as a base for securing the traffic cone lantern in order to facilitate the second robot arm 130 to take up the traffic cone lantern.

In this embodiment, the second robot arm may be used to move the traffic cones in the stacking and storage area to the loading bay, and place the traffic cone lanterns in the traffic cone lantern take-up area on the traffic cones in the loading bay. This can realize automated and accurate arrangement of the traffic cones and the traffic cone lanterns on the vehicle. It can save manpower and make it easier for the first robot arm to place more traffic cones on the road.

In some embodiments, the at least one camera 140 may also be used for obtaining an image signal of the top of the identified traffic cone in the loading bay 111. After it is confirmed that the object on the road is a traffic cone and the traffic cone is retrieved to the loading bay 111, the camera 140 can be used to capture an image of the top of the traffic cone.

The processing unit 160 may be further configured to identify the traffic cone lantern on the identified traffic cone according to an image signal of the top of the identified traffic cone. The processing unit 160 can detect an edge line of the object on the top of the traffic cone to determine if there is a traffic cone lantern on top of the traffic cone. The second robot arm 130 may also be used to move the identify the traffic cone lantern to the traffic cone lantern storage area on the vehicle 110, and then move the identified traffic cone to the stacking and storage area 114. The traffic cone lantern storage area and the above-mentioned traffic cone lantern take-up area may be the same area or different areas, e.g. the areas at both ends on one side of the second robot arm 130.

In this embodiment, by identifying whether there is a traffic cone lantern on the traffic cone retrieved from the road, the second robot arm 130 can be further used to collect and organize the traffic cone lanterns. This can facilitate the stacking and placing of the retrieved traffic cones in the stacking and storage area 114 so that the vehicle can accommodate more traffic cones.

In some embodiments, referring to FIG. 1 and FIG. 2, the system of placing and collecting traffic cones and traffic cone lanterns may further include a traffic cone lantern conveying device 116. The traffic cone lantern conveying device 116 may be used for conveying the traffic cone lantern in the traffic cone lantern storage area to the traffic cone lantern take-up area. The traffic cone lantern conveying device 116 can be in the form of a slanted structure. A surface of the slanted structure may be provided with a groove or passage for receiving the traffic cone lantern. Both ends of the slanted structure can be open. The higher end can be used to receive manually placed traffic cone lanterns, or can receive traffic cone lanterns constantly transferred from the traffic cone lantern storage area through a conveyor belt. The lower end can expose the traffic cone lantern, and may be used as a traffic cone lantern take-up area. Whenever the traffic cone lantern is removed from the lower end, the traffic cone lantern behind will slide down to the lower end under the action of gravity. Similarly, a conveyor belt can be used instead of this structure and can save storage space. In the embodiment, the traffic cone lantern conveying device 116 can be used to convey the traffic cone lanterns stored on the vehicle 110 to the traffic cone lantern take-up area suitable for the second robot arm 130 to grab the traffic cone lantern.

Figure 4:
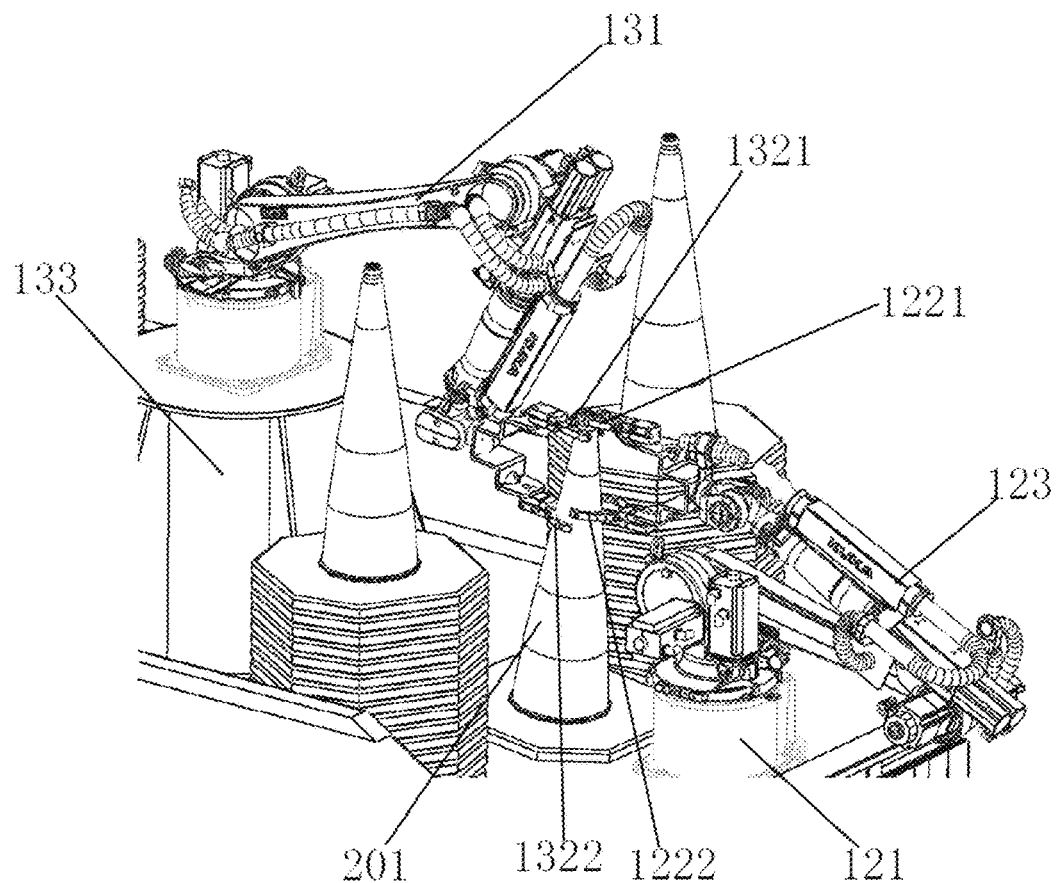
FIG. 4 is a schematic diagram of a first and second robot arm clamping a traffic cone according to an embodiment of the present disclosure.
Figure 5:
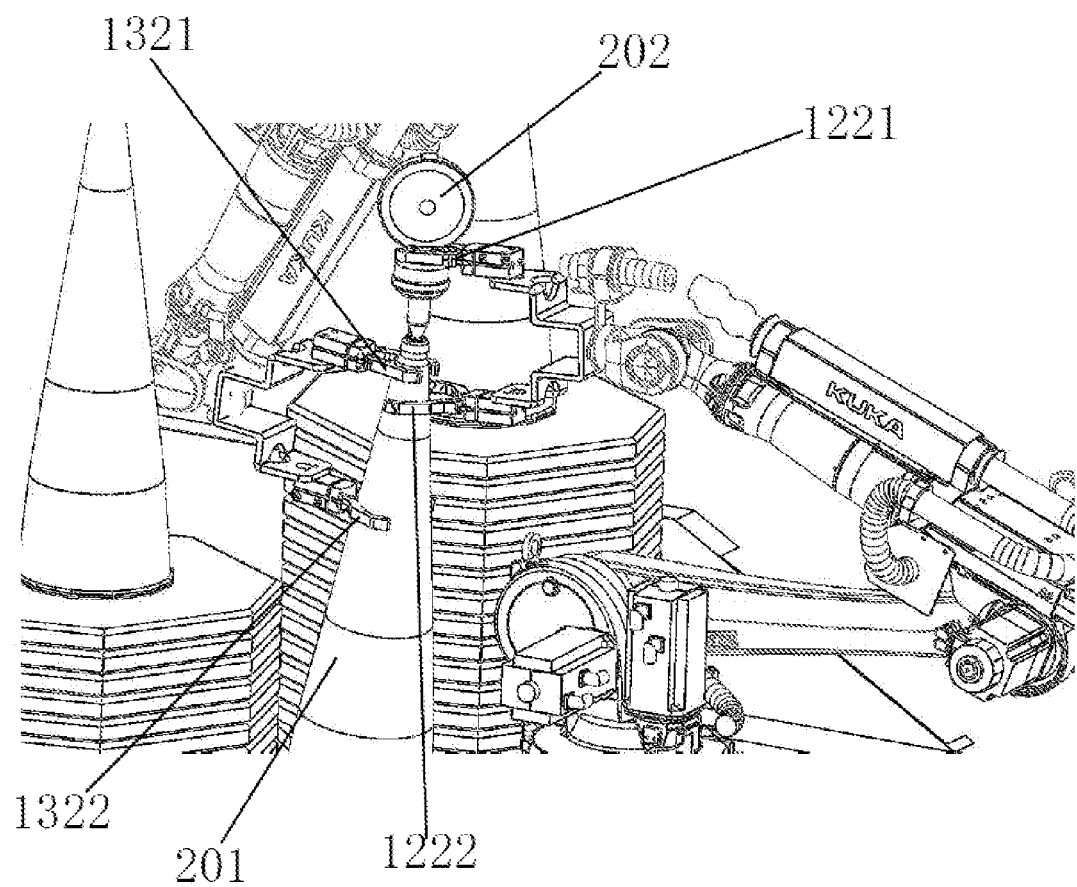
FIG. 5 is a schematic diagram of a first and second robot arm clamping a traffic cone and a traffic cone lantern according to an embodiment of the present disclosure.

The first robot arm 120 and the second robot arm 130 of various embodiments may be existing robot arms or specially designed robot arms suitable for grabbing a traffic cone. FIG. 4 is a schematic diagram of the first and second robot arms clamping a traffic cone according to an embodiment of the present disclosure. FIG. 5 is a schematic diagram of the first and second robot arms clamping a traffic cone 201 and a traffic cone lantern 202 according to an embodiment of the present disclosure. Referring to FIGS. 1, 2, 4 and 5, in some embodiments, the first robot arm 120 may include a first robotic arm 121 and a first clamp 122. The first robot arm 120 may be mounted at the rear part 112 of the vehicle 110 by a first support frame 123. The first clamp 122 may include a first jaw for clamping the traffic cone 201, or may include at least two first jaws, for example, two first jaws 1221, 1222 for clamping at least two different positions of the traffic cone 201. Each first jaw 1221, 1222 may include two arc-shaped mechanical fingers that can be opened and closed to match the shape of the traffic cone. The first jaw 1222 can be used for clamping a certain position of the traffic cone 201 while the first jaw 1221 can also be used to clamp the traffic cone lantern, such as clamping the neck portion of the traffic cone lantern, as shown in FIG. 5. The second robot arm 130 may include a second robotic arm 131 and a second clamp 132. The second robot arm 130 may be mounted at the middle part 113 of the vehicle 110 by a second support frame 133. The second clamp 132 may include a second jaw for clamping the traffic cone 201, or may include at least two second jaws, for example, two second jaws 1321, 1322 for clamping at least two different positions of the traffic cone 201. Similar to the first jaws 1221, 1222 shown in FIG. 5, the first jaw 1321 can also be used to clamp the traffic cone lantern 202, such as clamping the neck portion of the traffic cone lantern. The second jaw 1322 can be used for clamping a certain position of the traffic cone 201. The inner side the first jaws 1221, 1222 and the second jaws 1321, 1322 may be provided with sensors for sensing the strength of the clamps.

In this embodiment, the first robot arm and the second robot arm are respectively provided with jaws to facilitate the clamping of traffic cones or traffic cone lanterns. By providing at least two jaws, it can facilitate stable clamping of the traffic cone. The second jaw of the second robot arm can be used for taking up both the traffic cone and the traffic cone lantern.

In some embodiments, referring again to FIG. 3, the system for placing and collecting traffic cones and traffic cone lanterns may also include a display device 170 and an input device 1100. The display device 170 and the input device 1100 may respectively be connected to the processing unit 160. The input device 1100 can be a keyboard, and the display device 170 can be a display, or the display device 170 and the input device 1100 can achieve display and input function simultaneously through a touch screen. The display device 170 can be used to display prompt information on driving or stopping of the vehicle 110 so as to prompt the driver to drive or stop the vehicle. The display device 170 can be used to display the placing of traffic cones on the road, and the relative position of the traffic cones and the vehicle 110, thereby facilitating monitoring of the traffic cone layout. The display device 170 can also be used to display an operation mode, such as placing traffic cones or collecting traffic cones for the user to select. The input device 1100 can be used to input or select the shape of the traffic cones on the road, and can be used to select the operation mode of the placement of traffic cones or the operation mode of the collection of traffic cones. In this embodiment, the display device 170 and the input device 1100 can facilitate workers on the vehicle 110 to monitor the system's operation conditions and set the system's operation modes.

In other embodiments, referring again to FIG. 3, the system of placing and collecting traffic cones and traffic cone lanterns may also include a wireless communication device 180, such as a wireless router, that can be used to provide a wireless access point. The wireless communication device 180 may be connected to the processing unit 160. In this way, the processing unit 160 can wirelessly transmit information that needs to be displayed, for example, on a mobile phone, or wirelessly receive information input from the mobile phone to the processing unit 160. In this embodiment, the operation of the system can be remotely monitored or controlled through the wireless communication device 180.

Figure 6:
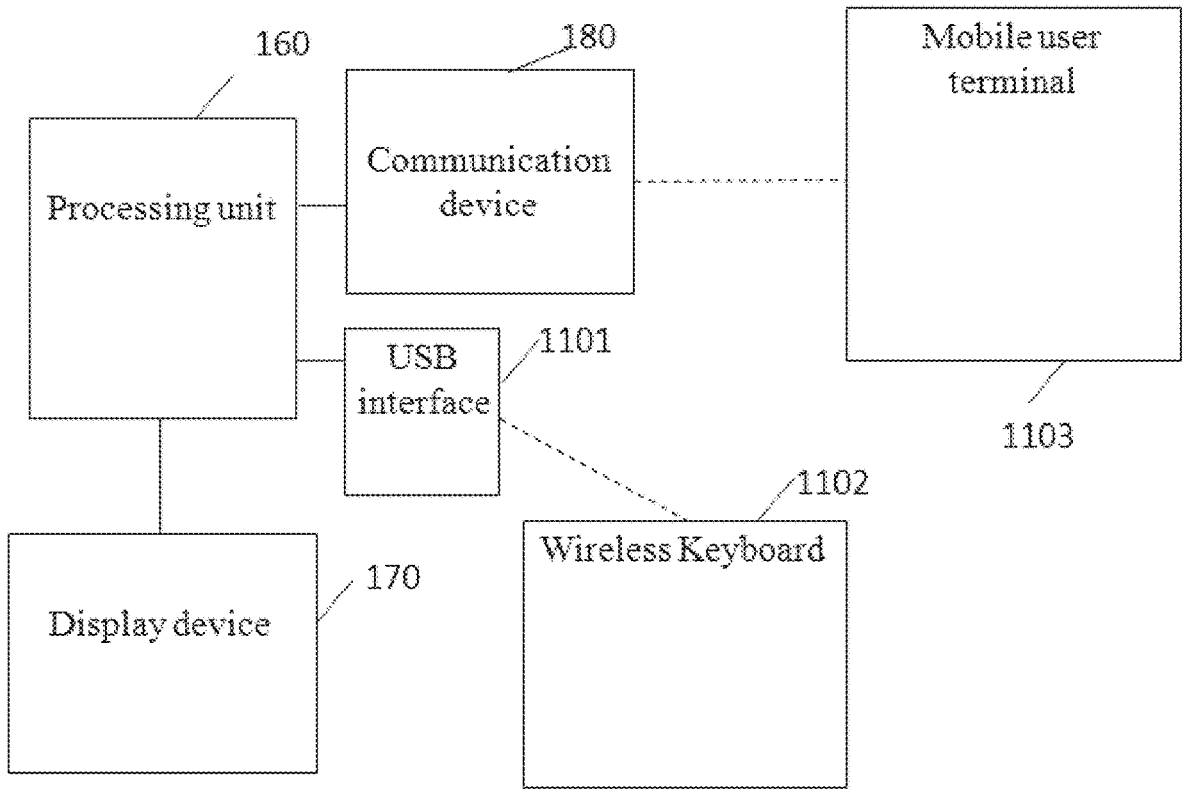
FIG. 6 is a schematic diagram showing a connection relationship of a human-computer interaction device according to an embodiment of the present disclosure.

FIG. 6 is a schematic diagram showing the connection relationship of a human-machine interaction device according to an embodiment of the present disclosure. As shown in FIG. 6, in some particular embodiments, the processing unit 160 may be connected to the wireless communication device 180 and display device 170, respectively, or it can be connected to a wireless keyboard 1102 through an USB interface 1101, and the wireless keyboard 1102 may be used for wireless input. The USB interface 1101 and the wireless keyboard 1102 can be wirelessly connected in the 2.4 GHz band. The wireless communication device 180 can be connected to a mobile user terminal 1103 (e.g., a mobile phone) via a wireless network. An application can be installed on the mobile user terminal 1103 for displaying or inputting information.

In some embodiments, referring again to FIG. 3, the system for placing and collecting traffic cones and traffic cone lanterns may also include an emergency switch 190. The emergency switch 190 may be connected to the processing unit 160. If necessary, the emergency switch 190 can be manually pressed so as to stop the operation of the components of the system of placing and collecting traffic cones and traffic cone lanterns.

Based on the same inventive concept as the system of placing and collecting traffic cones and traffic cone lanterns of the embodiments of the present disclosure, the present disclosure also provides a method for placing traffic cones and traffic cone lanterns, and a method for collecting traffic cones and traffic cone lanterns. The method for placing traffic cones and traffic cone lanterns and the method for collecting traffic cones and traffic cone lanterns are applicable to the above embodiments of the system of placing and collecting traffic cone and traffic cone lanterns. The same or similar contents can be implemented by referring to the above-mentioned system of placing and collecting traffic cones and traffic cone lanterns, and will not be repeated.

Figure 7:
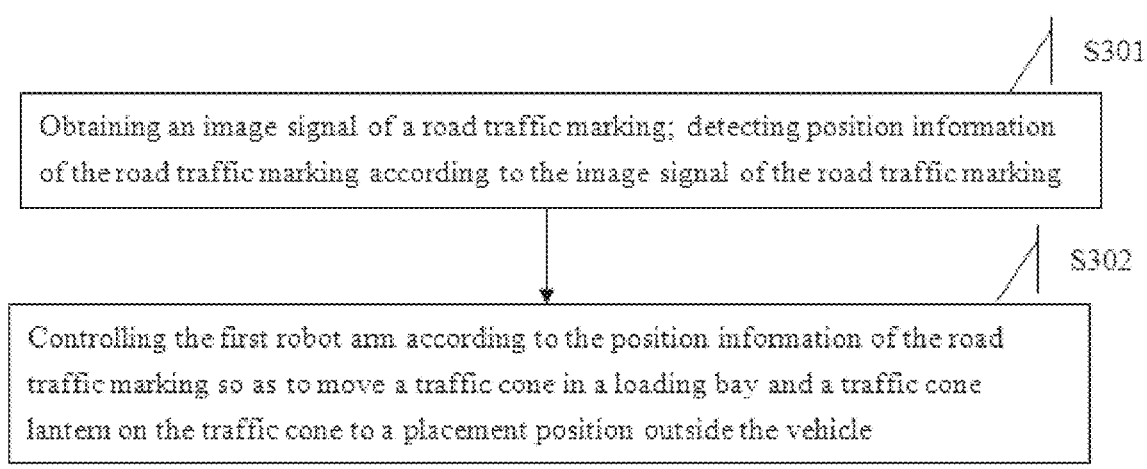
FIG. 7 is a schematic flow chart of a method for placing traffic cones and traffic cone lanterns according to an embodiment of the present disclosure.

FIG. 7 is a flow chart showing a method of placing traffic cones and traffic cone lanterns according to an embodiment of the present disclosure. As shown in FIG. 7, the method for placing traffic cones and traffic cone lanterns may include:

Step S301: obtaining an image signal of a road traffic marking; detecting position information of the road traffic marking according to the image signal of the road traffic marking; and Step S302: controlling the first robot arm on the vehicle according to the position information of the road traffic marking so as to move a traffic cone or a traffic cone with a traffic cone lantern in a loading bay of a vehicle to a placement position outside the vehicle.

In the above step S301, an image of the road traffic marking can be taken by the at least one camera. The at least one camera provides an image signal for subsequent processing. According to the image signal of the road traffic marking, a sideline of the road traffic marking can be identified, such that the whole road traffic marking can be identified. Then, the physical location of the road traffic marking can be determined. In the above step S302, according to the position information of the road traffic marking, the moving direction and distance of the vehicle can be determined, and then the shape of placement of traffic cones on the road can be determined. For example, the vehicle can move along the road traffic marking. The first robot arm can be controlled according to the distance and interval entered so as to place a traffic cone on the road. The shape of placement of traffic cones on the road can be consistent with the shape of the road traffic marking. At the same time, the traffic cone lanterns on the traffic cones are placed on the road. The method of this embodiment can realize automated and accurate placement of traffic cones and traffic cone lanterns on the road.

Figure 8:
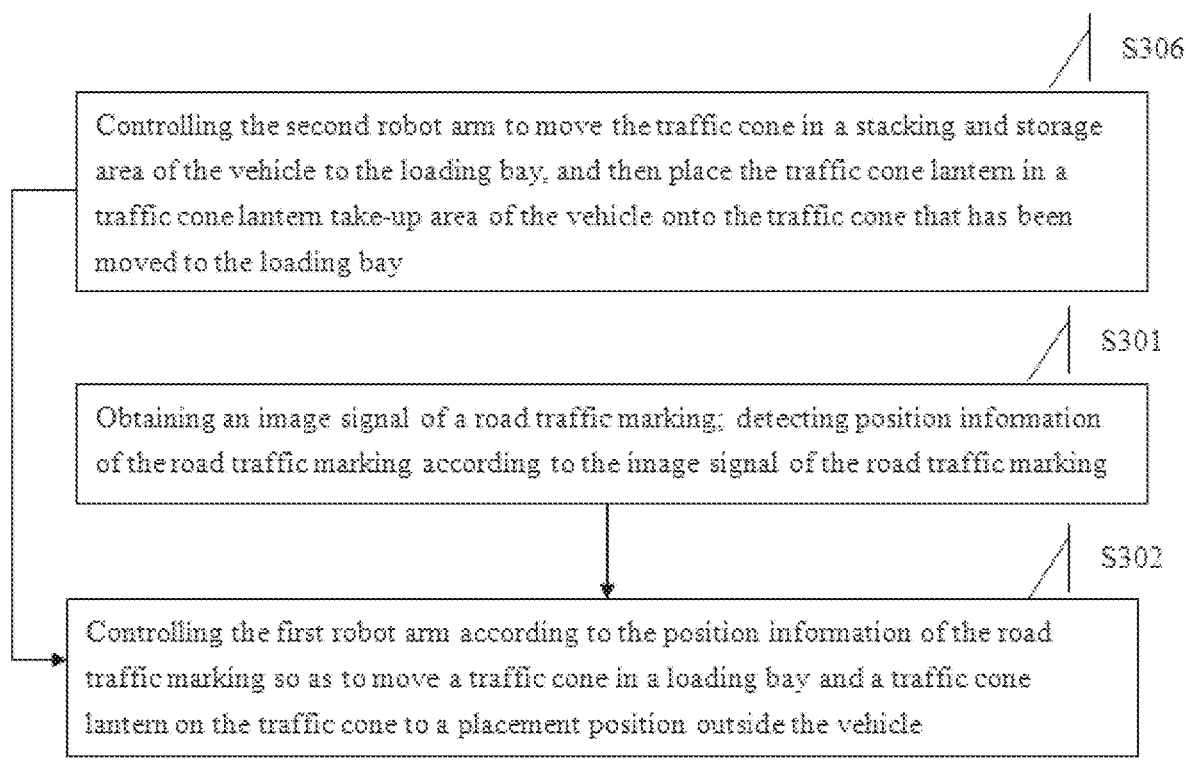
FIG. 8 is a schematic flow chart of a method for placing traffic cones and traffic cone lanterns according to another embodiment of the present disclosure.

FIG. 8 is a flow chart showing a method of placing traffic cones and traffic cone lanterns according to another embodiment of the present disclosure. As shown in FIG. 8, before the step S302 shown in FIG. 7, i.e., before the step of controlling the first robot arm according to the position information of the road traffic marking so as to move a traffic cone or a traffic cone with a traffic cone lantern in a loading bay of a vehicle to the outside of the vehicle, the method may include:

Step S306: controlling the second robot arm to move the traffic cone in a stacking and storage area of the vehicle to the loading bay, and then place the traffic cone lantern in a traffic cone lantern take-up area of the vehicle onto the traffic cone that has been moved to the loading bay.

The step S306 can be performed simultaneously with the above step S301, or sequentially. In this embodiment, through the above step S306, it is possible to automatically manage the traffic cones and the traffic cone lanterns on the vehicle. The traffic cones can be moved to a position that facilitates take-up by the first robot arm. The traffic cone lantern may be mounted on the traffic cone so that the first robot arm can place the traffic cone and traffic cone lantern simultaneously on the road.

Figure 9:
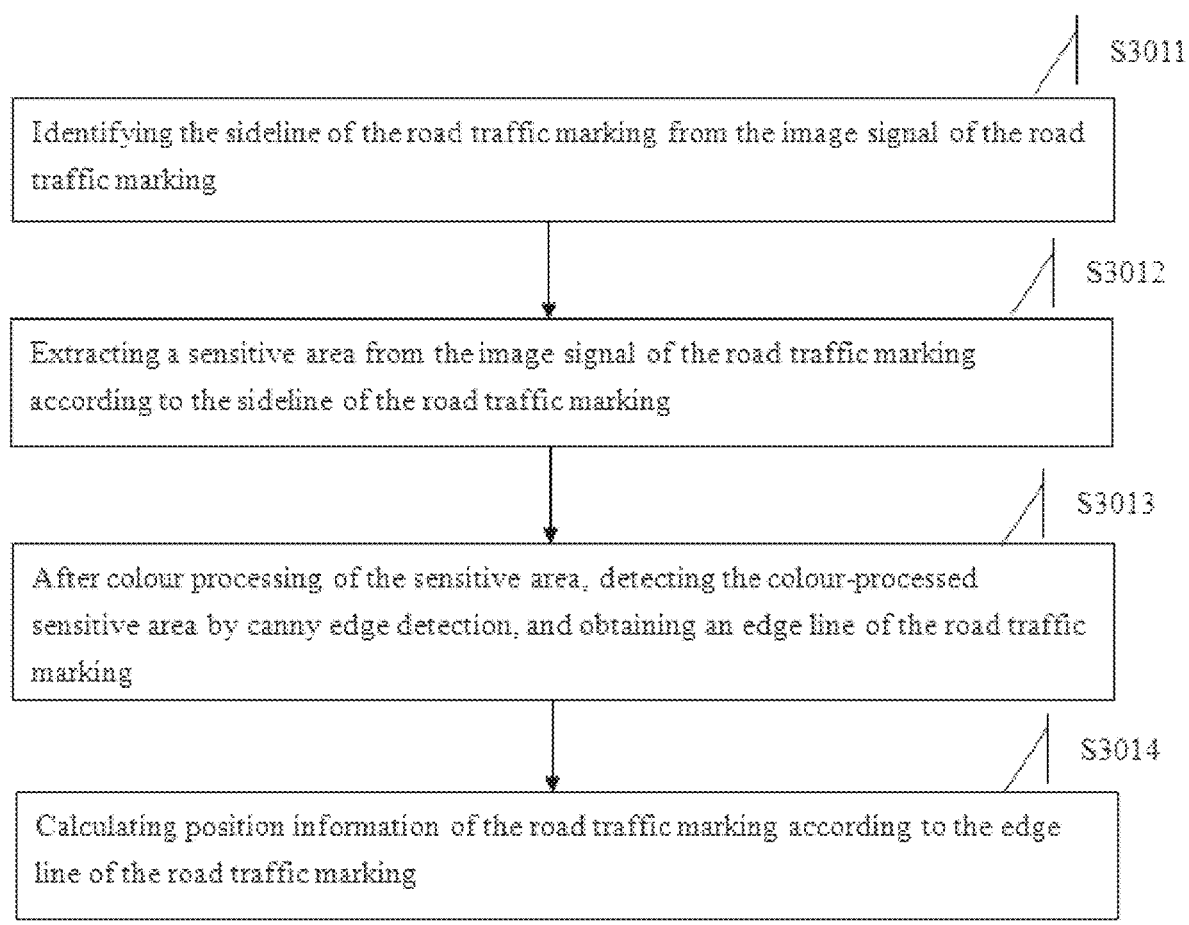
FIG. 9 is a schematic flow chart of a method of detecting position information of a road traffic marking according to an image signal of the road traffic marking according to an embodiment of the present disclosure.

FIG. 9 is a schematic flow chart of a method of detecting position information of a road traffic marking according to an image signal of the road traffic marking according to an embodiment of the present disclosure. As shown in FIG. 9, the above step S301, i.e. the step of detecting position information of the road traffic marking according to the image signal of the road traffic marking may include:

Step S3011: identifying the sideline of the road traffic marking from the image signal of the road traffic marking;

Step S3012: extracting a sensitive area from the image signal of the road traffic marking according to the sideline of the road traffic marking;

Step S3013: after colour processing of the sensitive area, detecting the colour-processed sensitive area by canny edge detection, and obtaining an edge line of the road traffic marking; and Step S3014: calculating position information of the road traffic marking according to the edge line of the road traffic marking.

In the above step S3011, the sideline of the road traffic marking can be identified by traffic lane edge recognition technology.

In the above step S3012, if the sideline of the road traffic marking is detected, then the sensitive area (ROI) can be extracted. In the above step S3013, after colour processing, the edge of the line segment can be detected by canny edge detection. The result is calculated to check if it is a line. The sideline portions will form a continuous line. In the above step S3014, the position of this continuous line will be converted into a physical location on the road by a pre-aligned polynomial for use by the robot arms.

Figure 10:
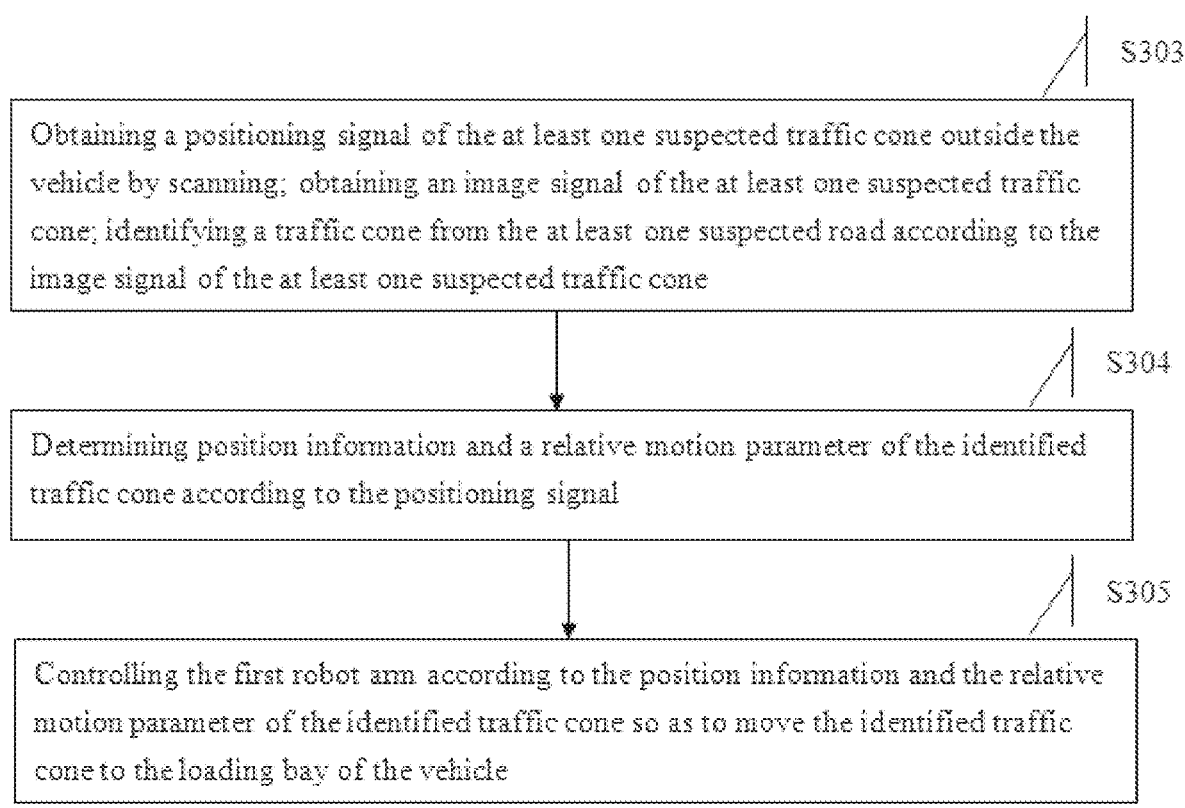
FIG. 10 is a schematic flow chart of a method for collecting traffic cones and traffic cone lanterns according to an embodiment of the present disclosure.

FIG. 10 is a flow chart showing a method of collecting traffic cones and traffic cone lanterns according to an embodiment of the present disclosure. As shown in FIG. 10, the method of collecting traffic cones and traffic cone lanterns may include:

Step S303: obtaining a positioning signal of the at least one suspected traffic cone outside the vehicle by scanning; obtaining an image signal of the at least one suspected traffic cone; identifying a traffic cone from the at least one suspected road according to the image signal of the at least one suspected traffic cone;

Step S304: determining position information and a relative motion parameter of the identified traffic cone according to the positioning signal; and Step S305: controlling the first robot arm according to the position information and the relative motion parameter of the identified traffic cone so as to move the identified traffic cone to the loading bay of the vehicle.

In the above step S303, the suspected traffic cone can be obtained through scanning the shape of the detection target in the detection area by a radar. The positioning signal of the suspected traffic cone can be obtained by detecting the suspected traffic cone using a radar. After initially determining that the detection target is a suspected traffic cone according to the shape of the detection target, further confirmation can be made by the signal of the captured image. In the above step S304, the positioning signal may include physical location information of the detection target and the relative motion parameter, e.g. the relative acceleration rate, deceleration rate, speed, distance and direction between the vehicle and the detection target. In the above step S305, according to the position information and the motion parameter of the identified traffic cone, prompt information on the movement of the vehicle can be given. The capture time and position precisely calculated by the processing unit can be used to control the first robot arm so as to collect the identified traffic cone to the vehicle. In this embodiment, through the above steps S303 to S305, it is possible to automatically and accurately collect the traffic cones from the road to the vehicle while the vehicle is moving.

Figure 11:
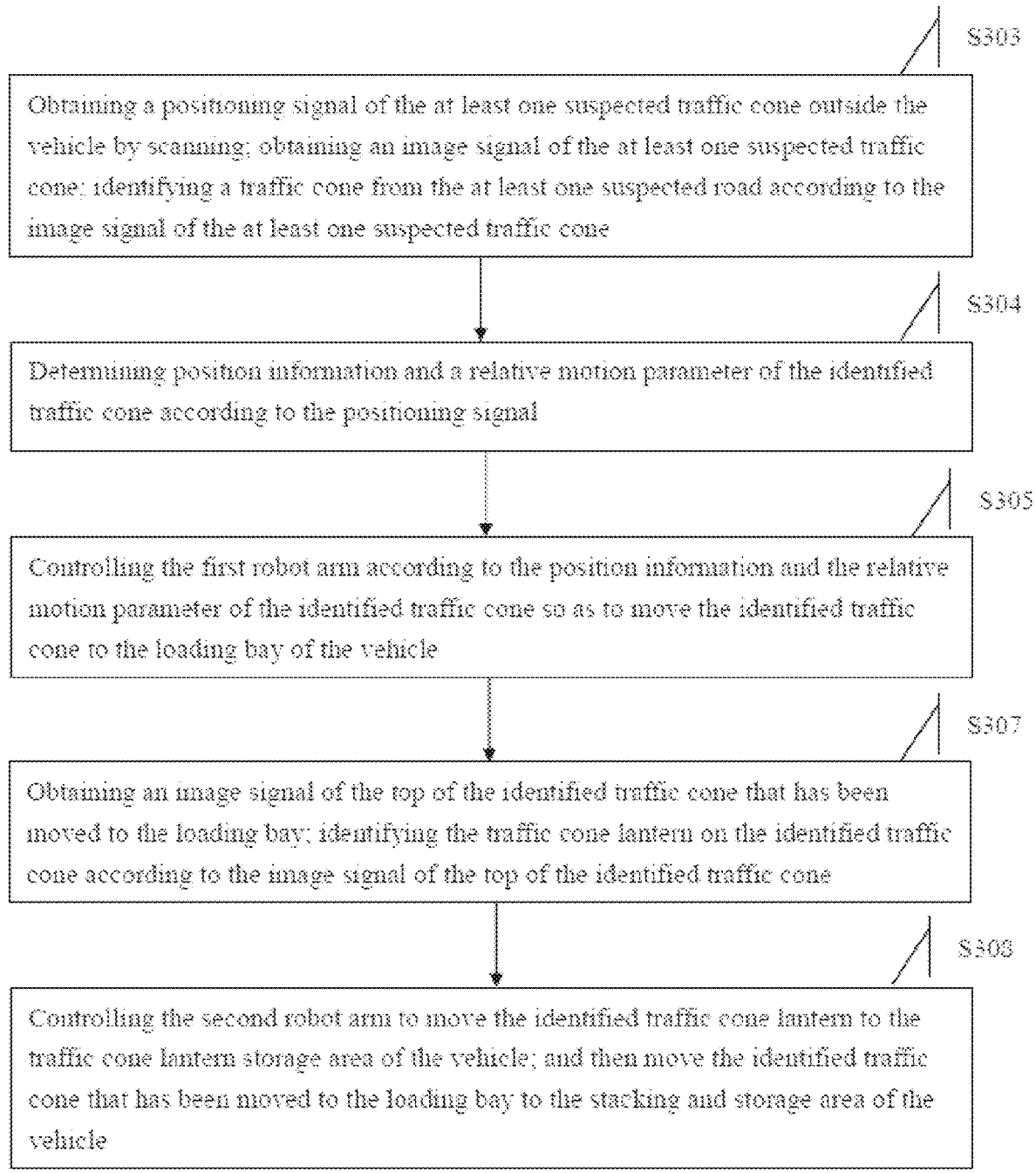
FIG. 11 is a schematic flow chart of a method for collecting traffic cones and traffic cone lanterns according to another embodiment of the present disclosure.

FIG. 11 is a flow chart showing a method of collecting traffic cones and traffic cone lanterns according to another embodiment of the present disclosure. As shown in FIG. 11, the method for collecting traffic cones and traffic cone lanterns shown in FIG. 10 may further include:

Step S307: obtaining an image signal of the top of the identified traffic cone that has been moved to the loading bay; identifying the traffic cone lantern on the identified traffic cone according to the image signal of the top of the identified traffic cone; and Step S308: controlling the second robot arm to move the identified traffic cone lantern to the traffic cone lantern storage area of the vehicle; and then move the identified traffic cone that has been moved to the loading bay to the stacking and storage area of the vehicle.

In the above step S308, the traffic cone can be clamped and tilted by the second robot arm, and the traffic cone lantern can slide down to the traffic cone lantern storage area. In this embodiment, through the above steps S307 and S308, one can further identify whether there is a traffic cone lantern on top of the traffic cone retrieved to the loading bay. In case there is a traffic cone lantern, the second robot arm can be used to further collect and organize the traffic cone and the traffic cone lantern thereon.

Figure 12:
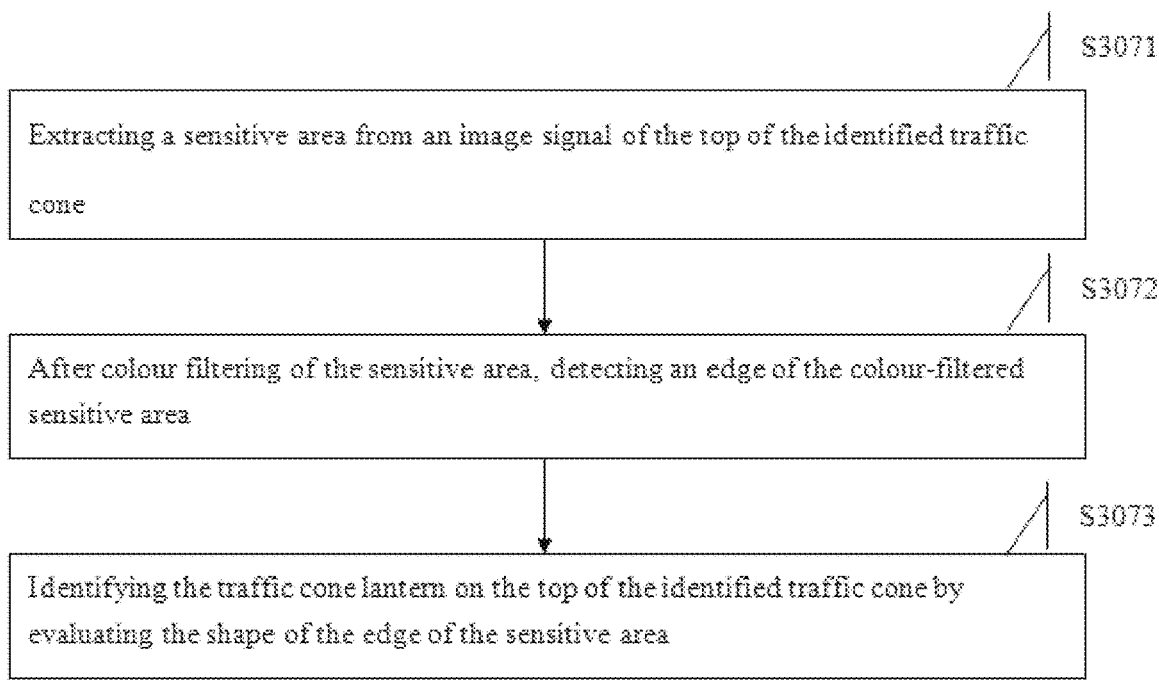
FIG. 12 is a schematic flow chart of a method for identifying a traffic cone lantern on an identified traffic cone according to an image signal of the top of the identified traffic cone according to an embodiment of the present disclosure.

FIG. 12 is a flow chart of a method for identifying a traffic cone lantern on an identified traffic cone according to an image signal of the top of the identified traffic cone according to an embodiment of the present disclosure. As shown in FIG. 12, the above step S307, i.e., the step of identifying the traffic cone lantern on the identified traffic cone according to the image signal of the top of the identified traffic cone may include:

Step S3071: extracting a sensitive area from an image signal of the top of the identified traffic cone;

Step S3072: after colour filtering of the sensitive area, detecting an edge of the colour-filtered sensitive area; and Step S3073: identifying the traffic cone lantern on the top of the identified traffic cone by evaluating the shape of the edge of the sensitive area.

In this embodiment, traffic cone lantern detection can be initiated after the traffic cone is placed in the loading bay. The camera can check the top of the traffic cone, and extract the sensitive area (ROI). After colour filtering and through careful edge detection, the edge of the object can be detected. The result can be evaluated by an image processing shape recognition algorithm to check if there exists a shape of the traffic cone lantern.

In order to enable those skilled in the art to better understand the specific embodiments of the present disclosure, the following embodiments illustrate the implementation of the present disclosure.

Referring to FIG. 1, the system of placing and collecting traffic cones and traffic cone lanterns may include: mechanical components mounted in the vehicle, e.g., clamps (132, 122), robot arms (131, 121), traffic cone lantern conveying device 116, support frames (113, 123), etc. The robot arms (131, 121) and their clamps (132, 122) (mechanical system) may be respectively mounted at, for example, the middle part and the rear part of the vehicle through the support frames (113, 123). The mechanical system in the rear part (first robot arm 120) can place and collect the traffic cones and the traffic cone lanterns on the road. The mechanical system in the middle part (second robot arm 130) can store and manage the traffic cones and the traffic cone lanterns.

Figure 13:
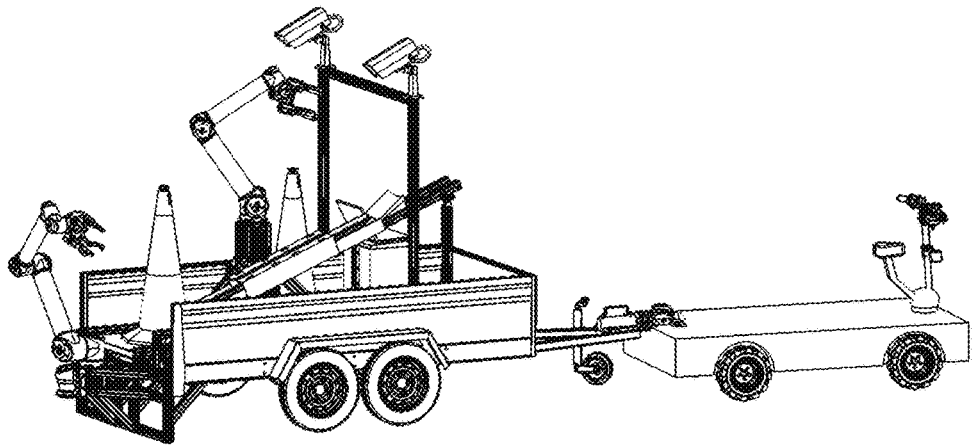
FIG. 13 is a perspective view of the system for placing and collecting traffic cones and traffic cone lanterns according to another embodiment of the present disclosure.

FIG. 13 is a perspective view of the system for placing and collecting traffic cones and traffic cone lanterns according to another embodiment of the present disclosure. As shown in FIG. 13, the vehicle in the system for placing and collecting traffic cones and traffic cone lanterns can be a simplified vehicle, such as a rickshaw or a small motor vehicle, which can be used for testing.

Further, referring to FIG. 3, the system of placing and collecting traffic cones and traffic cone lanterns may further include: a display device, an input device, a wireless access point, an emergency switch, an industrial computer, a camera, and a laser radar. The display device can be used to output display information. The input device and the emergency switch can be used to input the required information or signals. The camera and the laser radar can be used to sense and identify a target. The wireless access point and the industrial computer can space the input and output functions. These settings can be used to implement sensing and positioning. The laser radar and the camera can be combined to form a sensor system, which can be connected to the industrial computer via a high-speed wired network. The robot arms, the sensors and drivers can be combined to form a robot control system, which can be connected to the industrial computer via a high-speed wired network. The industrial computer can run the algorithm to control the entire system.

The sensor positioning may specifically involve a laser radar which can be used to scan and locate the position of the traffic cone within a target range for grabbing by the robot arm. During the placement process, the image captured by the camera can be transmitted to the industrial computer to detect the white road sideline. The laser radar can scan the spacing of the traffic cones. During the collecting process, the laser radar can identify the suspected traffic cone object within a scanning range based on the size of the object. After that, the camera can be used to confirm whether the suspected traffic cone object is a traffic cone. After collecting the traffic cone, the camera can detect if a traffic cone lantern is attached to the traffic cone. The system for placing and collecting traffic cones and traffic cone lanterns can be completed by one or two operators, including a driver and a worker. The driver is responsible for driving the vehicle based on signals from the system. The worker may monitor the progress of the placement and collection of the traffic cones and the traffic cone lanterns. The worker can stop the system by pressing a stop button in case of emergency. The driver may be simultaneously responsible for the work of the worker, so that one person may operate the entire system.

The human-machine interface (HMI) used by the operator may include: a wireless user terminal display interface, which may be connected to the wireless access point through a mobile phone WiFi to instantly display/input real-time signals (as shown in FIG. 6); and a display device and key input/touch screen input on the vehicle (as shown in FIG. 6). Both have the same input function, and one of them can be chosen.

The operation process of the system for placing and collecting traffic cones and traffic cone lanterns may be as follows:

Step (1): The operator interacts with the human-machine interface (HMI) before starting the work, enters the operation mode (placement of traffic cones/collection of traffic cones), enters a program for the layout of the placement of traffic cones containing the traffic cone lanterns, and enters an arrangement shape for the placement of traffic cones and the information needed.

Step (2): The operator drives the vehicle and pays attention to the driving prompt information at a driving instruction interface;

Step (3): When placement of traffic cones is needed, the work begins when the vehicle is started and reaches a position determined by the driver.

According to the program, the placement action is given to the mechanical system through the industrial computer so as to control the mechanical system in the middle part. The robot arm drives the clamp to grab the traffic cone in the stacking and storage area and place it in the loading bay. According to the programmed layout of traffic cone with traffic cone lantern, the traffic cone lantern may be placed on the traffic cone by the middle mechanical system, and then the traffic cone can be placed in a corresponding position on the road by the rear mechanical system. The robot arms for clamping the traffic cone and its clamp structure need to have sufficient loading and gripping effect to avoid falling of the traffic cone. The robot arm for picking the traffic cone lanterns and the robot arm for picking the traffic cones are using the same robot arm and clamps. The subsequent traffic cones will be automatically placed based on the spacing position calculated from the information of the sensors.

Step (4): When collection of traffic cones is needed and the vehicle reaches a position near the traffic cones, the laser radar at the rear part of the vehicle transmits the scanned object positioning signal to the industrial computer. At the same time, the camera performs traffic cone shape and colour identification on the scanned object, and sends the result as to whether the scanned object is a traffic cone to the industrial computer. The industrial computer then calculates the exact position of the conical object and the time the conical object is captured. The rear mechanical system takes corresponding action based on the position and speed commands given by the industrial computer and drives the clamps to collect the traffic cones onto the vehicle. If there is still a distance, the rear mechanical system will be instructed to wait in a standby position until the time and distance of capturing traffic cone match. The image taken by the camera can be transmitted to the industrial computer for comparative analysis in order to determine whether there is a traffic cone lantern on the traffic cone. The result is sent to the industrial computer. The industrial computer uses calculation command to control the mechanical system. If there is a traffic cone lantern, the middle mechanical system will put the traffic cone lantern back to the traffic cone lantern storage space, and put the traffic cone back to the traffic cone storage space.

Step (5): The operator only needs to drive along the road (forward for placement/backward for collection), and look at the prompting at the driving instruction interface, such as move, stop, drive faster, and drive more slowly. A radar map may show in real time whether the vehicle is located within the work area of the robot arm to fine-tune the steering until the entire automated traffic cone placement and collection process is completed.

Figures 14A, 14B:
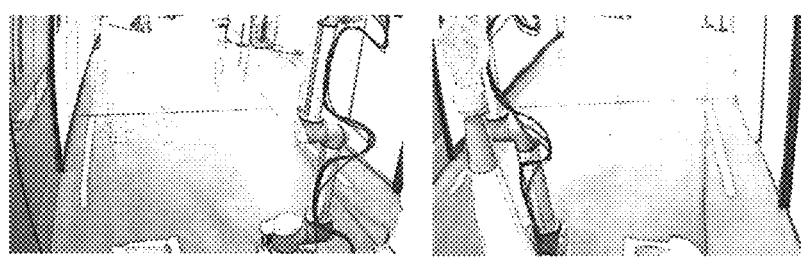
FIGS. 14*a* and 14*b* are images of a simulated road traffic marking to be identified.
Figure 15A:
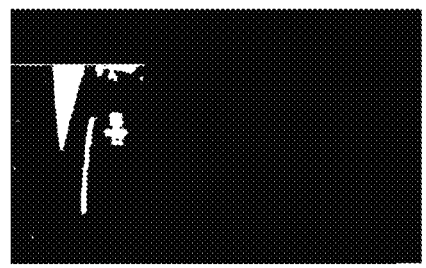
FIGS. 15*a* and 15*b* are images of sensitive areas extracted from the images shown in FIGS. 14*a* and 14*b*, respectively.
Figure 15B:
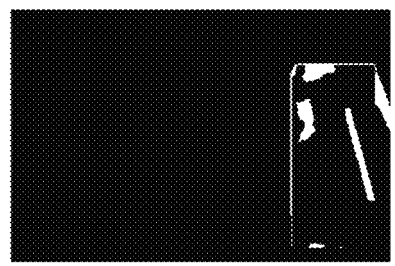
Figure 16A:
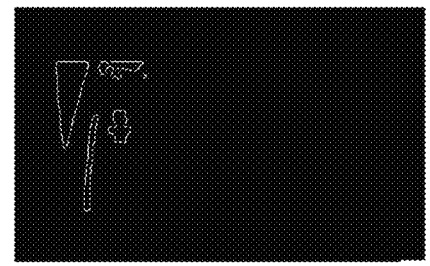
FIGS. 16*a* and 16*b* are images of edge lines detected from the sensitive areas shown in FIGS. 15*a* and 15*b*, respectively.
Figure 16B:
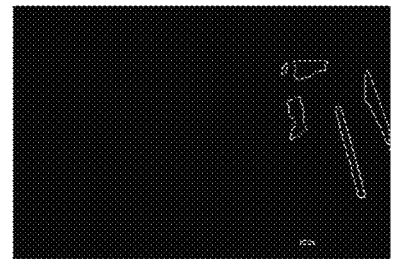
Figure 17A:
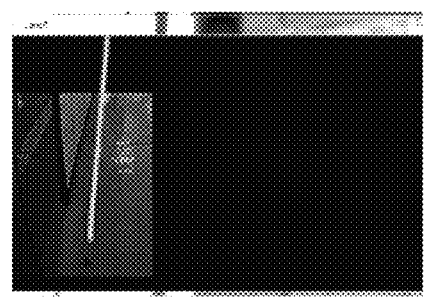
FIGS. 17*a* and 17*b* are simulated road traffic markings drawn according to the edge lines shown in FIGS. 16*a* and 16*b*, respectively.
Figure 17B:
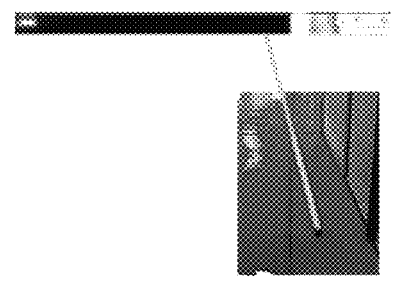

FIGS. 14*a* and 14*b* are images of a simulated road traffic marking to be identified. FIGS. 15*a* and 15*b* are images of sensitive areas extracted from the images shown in FIGS. 14*a* and 14*b*, respectively. FIGS. 16*a* and 16*b* are images of edge lines detected from the sensitive areas shown in FIGS. 15*a* and 15*b*, respectively. FIGS. 17*a* and 17*b* are simulated road traffic markings drawn according to the edge lines shown in FIGS. 16*a* and 16*b*, respectively.

In the above step (3), referring to FIGS. 14*a* to 17*b*, when the traffic cone placement process starts, the traffic lane edge recognition technology is activated. If an edge line is detected, the sensitive area (ROI) is extracted. After colour processing, the edge of the line segment can be detected by canny edge detection. The result is calculated in order to check if it is a line. The edge line portions may form a continuous line. The position of this continuous line can be converted to a physical location on the road for use by the mechanical system.

Figure 18:
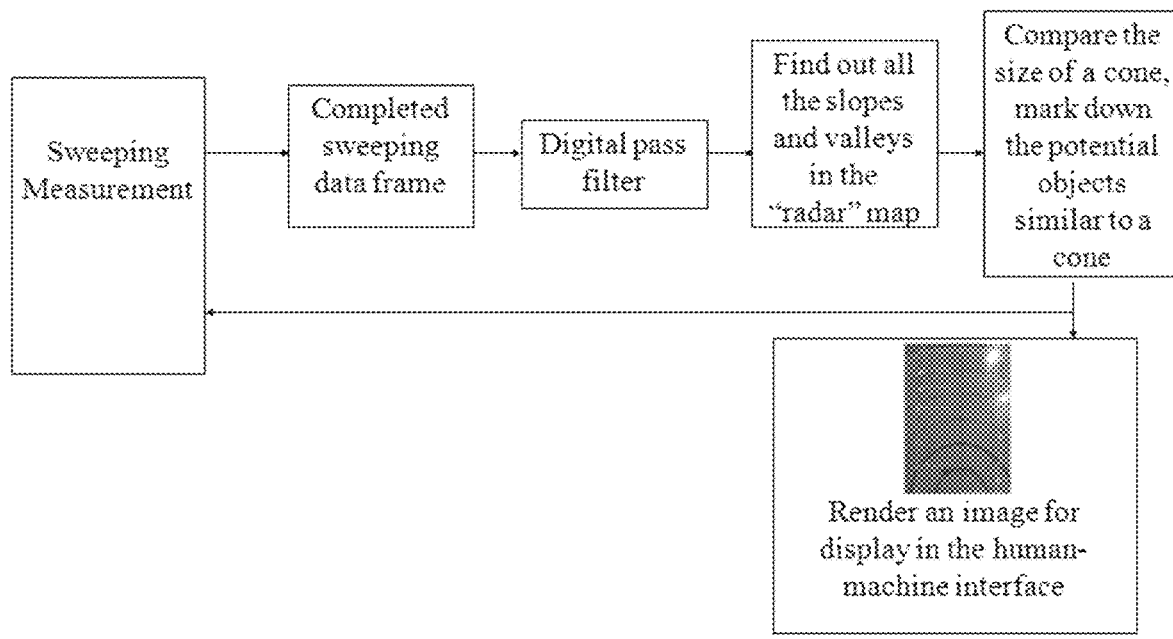
FIG. 18 is a schematic flow chart of a method for detecting a target object by a laser radar according to an embodiment of the present disclosure.

FIG. 18 is a flow chart showing a method of detecting a target object by a laser radar according to an embodiment of the present disclosure. As shown in FIG. 18, in the above step (3), when detecting a suspected traffic cone by using a radar, the following process can be implemented: (1) sweeping measurement; (2) Receiver 1: completed sweeping data frame; (3) digital pass filter; (4) find out all the slopes and valleys in the "radar" map; (5) compare the size of a cone, mark down the potential objects similar to a cone; and (6) render an image for HMI.

Figure 19:
FIG. 19 is an image of a traffic cone to be identified according to an embodiment of the present disclosure.
Figure 20:
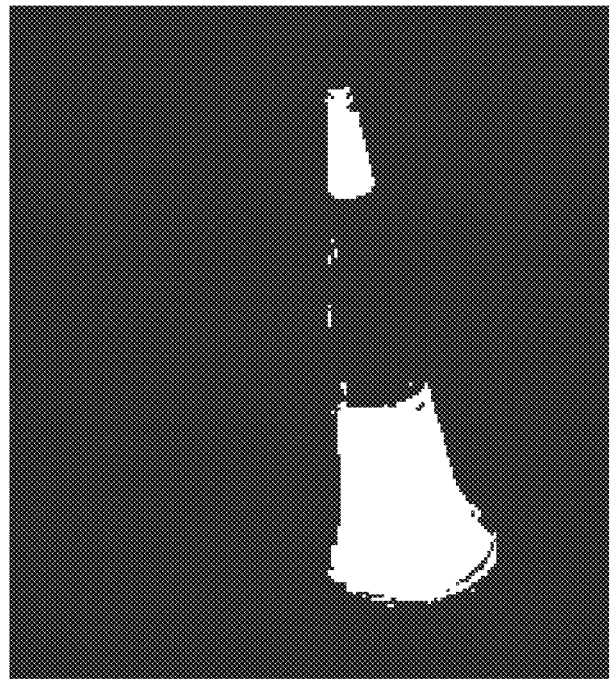
FIG. 20 is an image of a sensitive area extracted from the image in FIG. 19 by a camera.
Figure 21:
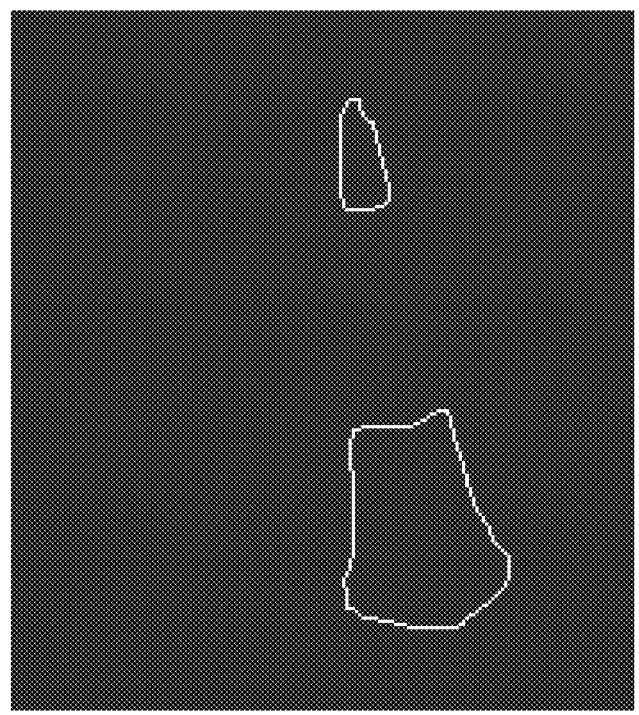
FIG. 21 is an image of an edge line detected according to the sensitive area shown in FIG. 20.
Figure 22:
FIG. 22 is an identification image of a traffic cone drawn according to the edge line shown in FIG. 21.

At the beginning of collecting an image of a traffic cone lantern, traffic cone detection can be started at the same time because the industrial computer uses multi-thread processing. FIG. 19 is an image of a traffic cone to be identified according to an embodiment of the present disclosure. FIG. 20 is an image of a sensitive area extracted from the image in FIG. 19 by a camera. FIG. 21 is an image of an edge line detected according to the sensitive area shown in FIG. 20. FIG. 22 is an identification image of a traffic cone drawn according to the edge line shown in FIG. 21. Referring to FIGS. 19 to 22, in the above step (3), the camera checks the detectable area detected by the laser radar. The sensitive area (ROI) is extracted based on the target detection result of the laser radar. After colour filtering, the edge of the object can be detected using canny edge detection method. The outline of the object obtained can be used to check if it is a traffic cone.

Figure 23:
FIG. 23 is an image of a traffic cone lantern to be identified according to an embodiment of the present disclosure.
Figure 24:
FIG. 24 is an image of a sensitive area extracted from the image shown in FIG. 23 by using a camera.
Figure 25:
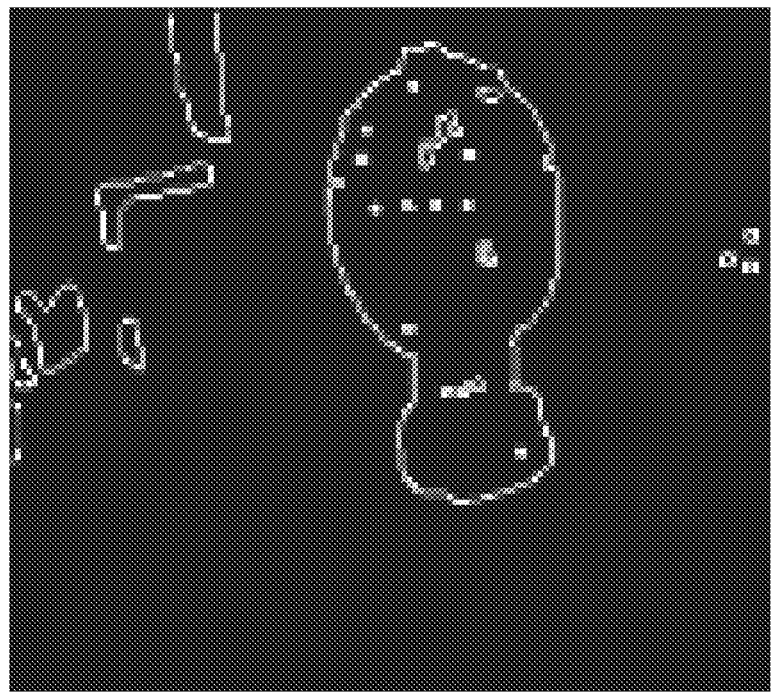
FIG. 25 is an image of the edge line detected from the sensitive area shown in FIG. 24.
Figure 26:
FIG. 26 is an image of an identified traffic cone lantern drawn according to the edge line shown in FIG. 25.

FIG. 23 is an image of a traffic cone lantern to be identified according to an embodiment of the present disclosure. FIG. 24 is an image of a sensitive area extracted from the image shown in FIG. 23 by using a camera. FIG. 25 is an image of the edge line detected from the sensitive area shown in FIG. 24. FIG. 26 is an image of an identified traffic cone lantern drawn according to the edge line shown in FIG. 25. Referring to FIG. 23 to FIG. 26, in the above step (3), when the traffic cone is placed in the loading bay, the detection of traffic cone lantern can be activated. The camera checks the top of the traffic cone and extracts the sensitive area (ROI). After colour filtering, the edge of the object can be detected through careful edge detection. The result is evaluated to check if it is a shape of a traffic cone lantern.

Figure 27:
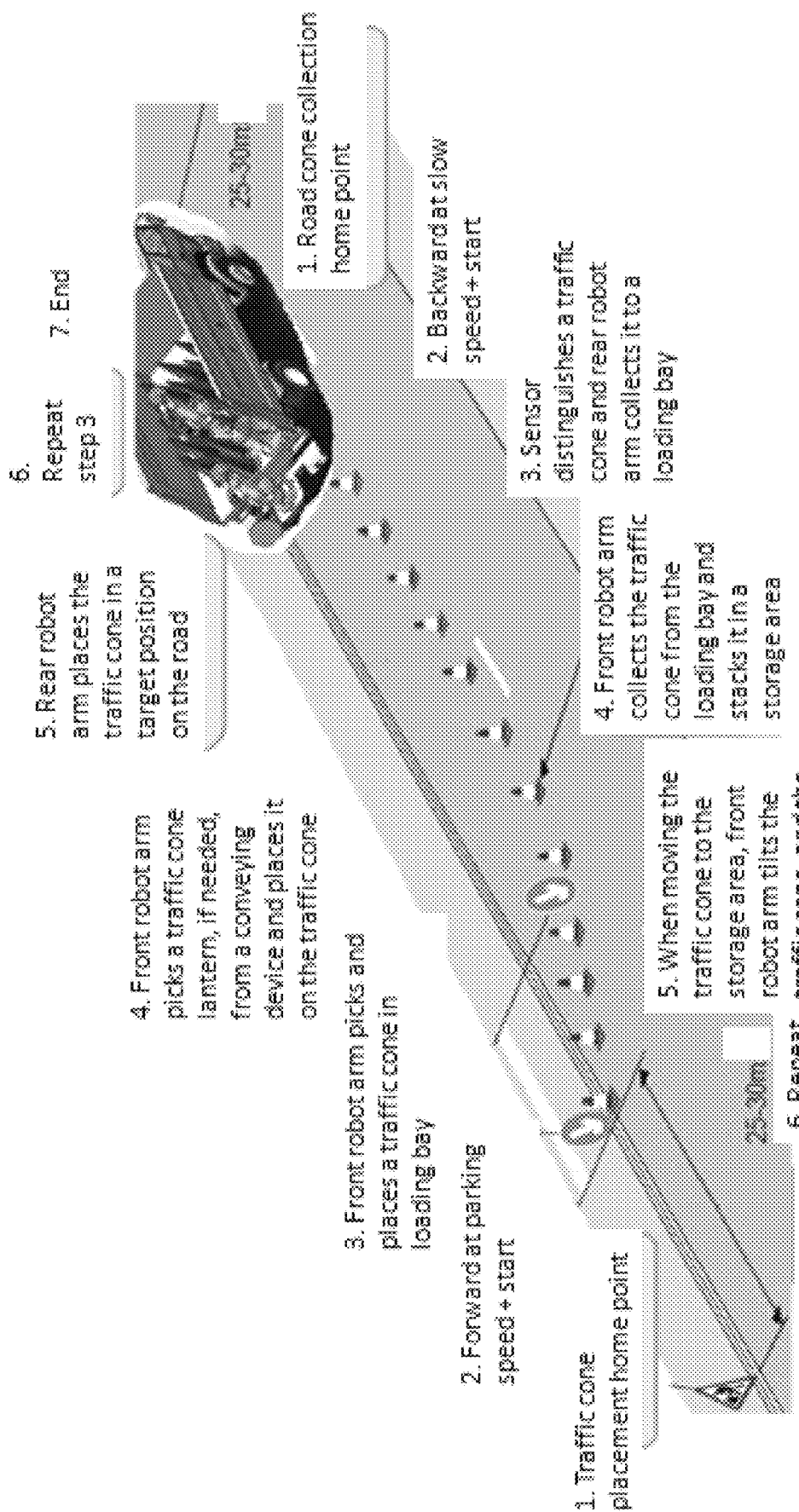
FIG. 27 is a schematic view showing the process of placing and collecting traffic cones and traffic cone lanterns according to an embodiment of the present disclosure.
Figure 28A:
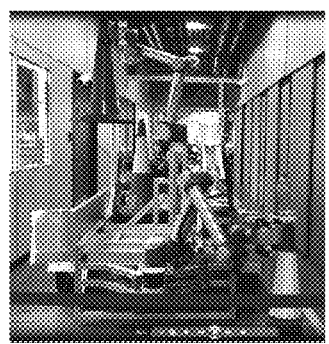
FIGS. 28*a* to 28*k* show a scenario of placing and collecting traffic cones and traffic cone lanterns along a straight line according to an embodiment of the present disclosure.
Figure 28B:
Figure 28C:
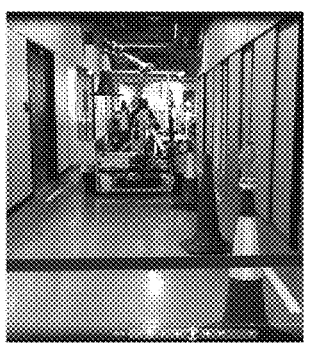
Figure 28D:
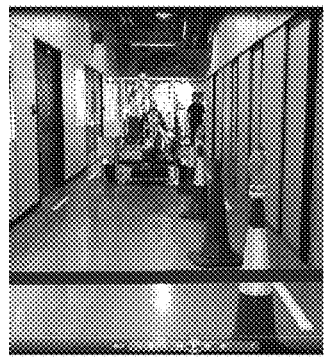
Figure 28E:
Figure 28F:
Figure 28G:
Figure 28H:
Figure 28I:
Figure 28J:
Figure 28K:
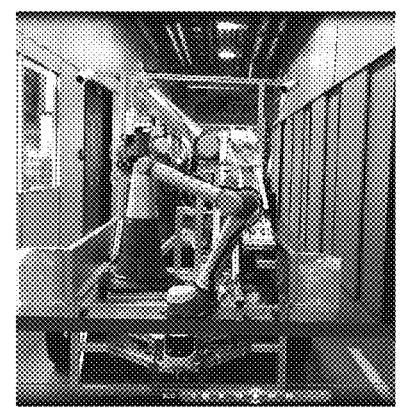
Figure 29A:
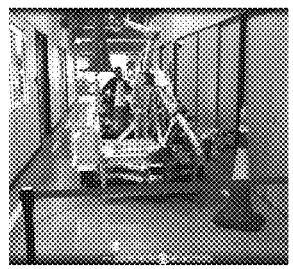
FIGS. 29*a* to 29*j* show a scenario of placing and collecting traffic cones and traffic cone lanterns along a slanted line according to an embodiment of the present disclosure.
Figure 29B:
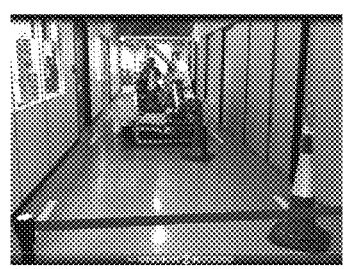
Figure 29C:
Figure 29D:
Figure 29E:
Figure 29F:
Figure 29G:
Figure 29H:
Figure 29I:
Figure 29J:

FIG. 27 is a schematic view showing the process of placing and collecting traffic cones and traffic cone lanterns according to an embodiment of the present disclosure. FIGS. 28*a* to 28*k* show a scenario of placing and collecting traffic cones and traffic cone lanterns along a straight line according to an embodiment of the present disclosure. FIGS. 29*a* to 29*j* show a scenario of placing and collecting traffic cones and traffic cone lanterns along a slanted line according to an embodiment of the present disclosure. As shown in FIG. 27 to FIG. 29*j*, in an automated traffic cone work, the process of laying traffic cones and traffic cone lanterns includes a placement process and a collection process. It may include the following seven steps.

The placement process may be specifically divided into:
1. Turn on automated traffic cone placement function at placement home point;
2. Driver advances at constant parking speed;
3. Robot arm in the middle part of a vehicle compartment grabs and places a traffic cone in a traffic cone loading bay;
4. At the same time, a traffic cone lantern, if needed, is taken and placed on top of the traffic cone;
5. Robot arm at the rear part of the vehicle compartment places the traffic cone in the loading bay at a designated position on the road;
6. Repeat step 3 until the entire road work task is completed; and
7. Stop the automated traffic cone placement function.

In FIG. 27, the placement of traffic cones may include: 1. Home point; 2. Forward at parking speed+start; 3. Front robot arm picks and places the cone in loading position; 4. Front robot arm picks and places the lantern (if lantern is needed) from a conveying device onto the cone; 5. Rear robot arm picks the cone and places it down to the target position; 6. Repeat step 3; and 7. End.

The collection process may be specifically divided into:
1. Turn on automated traffic cone collection function at collection home point;
2. Driver reverses at constant slow speed;
3. Laser radar locates a traffic cone, rear robot arm retrieves the traffic cone to a loading bay in the vehicle compartment;
4. Robot arm in the middle part of the vehicle compartment puts the traffic cone in the loading bay back in a traffic cone stacking and storage area;
5. When the traffic cone is retrieved from the loading bay to the traffic cone stacking and storage area, robot arm first retrieves the traffic cone lantern to a traffic cone lantern storage area if the camera confirms that there is a traffic cone lantern on the traffic cone;
6. Repeat step 3; and
7. Stop the automated traffic cone collection function.

In FIG. 27, the collection of traffic cones may include: 1. Home point; 2. Backward at slow speed+start; 3. Sensor distinguishes a traffic cone and rear robot arm retrieves it to a loading bay; 4. Front robot arm collects the traffic cone from the loading bay and stacks it in a storage area; 5. When moving the traffic cone to the storage area, front robot arm tilts the traffic cone, and the traffic cone lantern, if present, slides down to a storage area; 6. repeat step 3; and 7. End.

In this embodiment, robot arms, laser radar, camera, and computer may be installed on the entire vehicle. Road cone lights and traffic cones can be accurately placed and accurately retrieved. The vehicle can be moving while placement and collection of traffic cone lanterns and traffic cones are being carried out. Robot arms can be used to place and collect traffic cones and traffic cone lanterns. Sensors positioning technology can be used to place the traffic cones. The positioning technology can detect the white road sideline. It can be arbitrarily programmed to lay out different arrangement shapes. The sensor positioning technology can be used to collect the traffic cones without the need of pre-arrangement. The vehicle may be provided with traffic cones and traffic cone lanterns storage space. The vehicle may have another mechanical system to store and manage the traffic cones and the traffic cone lanterns in the vehicle. The existing system can merely carry out placement and collection. Furthermore, some existing traffic cone placement systems can only use customized traffic cones. The present disclosure makes use of robot arms and sensors in a vehicle-mounted automated system for placing and collecting traffic cones and traffic cone lanterns to replace workers operating in different environments. The present disclosure can improve road work automation and replace manpower, reduce errors and shorten working hours, thereby reducing operating costs and improving work efficiency. It can increase the safety of road and roadside workers. It can carry out automated placement and collection of traffic cones and traffic cone lanterns at the same time, and has great market potential. An embodiment of the present disclosure further provides a computer readable storage medium on which a computer program is stored. The steps of the methods described in the above embodiments can be implemented when the program is executed by a processor.

An embodiment of the present disclosure further provides a computer device, including a memory, a processor, and a computer program stored in the memory and executable by the processor. The steps of the methods described in the above embodiments can be implemented when the program is executed by the processor.

The present disclosure provides a system for placing and collecting traffic cones and traffic cone lanterns, a method for placing traffic cones and traffic cone lanterns, a method for collecting traffic cones and traffic cone lanterns, a computer readable storage medium, and a computer device. It uses at least one camera to assist in detecting the position information of the road traffic marking. According to the position information of the road traffic marking, it can control the first robot arm to move the traffic cones on the vehicle and the traffic cone lanterns on the traffic cones from the vehicle. It can use robot arms instead of manual labour, and it can also place traffic cones and traffic cone lanterns thereon on the road. This can avoid exposure to road traffic hazards when workers are placing or collecting traffic cones on the road. Moreover, by means of carrying the first robot arm on the vehicle and having the traffic cones and the traffic cone lanterns thereon in the loading bay, one can place the traffic cones and the traffic cone lanterns thereon on the road in a certain shape while the vehicle is moving. Its accuracy is high and it is suitable for traffic cone work of relatively large quantity.

In the description of the specification, the reference to the term "an embodiment", "a specific embodiment", "some embodiments", "for example", "an example", "a specific example", or "some examples" means that a particular feature, structure, material, or characteristics described in connection with the embodiment or example is included in at least one embodiment or example of the present disclosure. In the present specification, the schematic presentation of the above terms is not necessarily referring to the same embodiment or example. Furthermore, the particular feature, structure, material, or characteristics may be combined in any suitable manner within one or more embodiments or examples. The sequence of steps involved in each embodiment is a schematic illustration of the embodiments of the present disclosure. The sequence of the steps is not limiting and may be appropriately adjusted as needed. Those skilled in the art should understand that the embodiments of this application may be provided as a method, a system, or a computer program product. Therefore, this application may be in the form of full hardware embodiments, full software embodiments, or a combination thereof. Moreover, this application may be in the form of a computer program product that is implemented on one or more computer-usable storage media (including, but not limited to, magnetic disk storage, CD-ROM and optical storage) containing computer-usable program codes.

This application is described referring to the flow chart and/or block diagram of the method, device (system) and computer program product according to the embodiments of this application. It should be understood that, each flow and/or block in the flow chart and/or block diagram and the combination of flow and/or block in the flow chart and/or block diagram may be realized via computer program instructions. Such computer program instructions may be provided to the processor of a general-purpose computer, special-purpose computer, a built-in processor or other programmable data processing devices, to produce a machine, so that the instructions executed by the processor of a computer or other programmable data processing devices may produce a device for realizing the functions specified in one or more flows in the flow chart and/or one or more blocks in the block diagram.

Such computer program instructions may also be stored in a computer-readable storage that can guide a computer or other programmable data processing devices to work in a specific mode, so that the instructions stored in the computer-readable storage may produce a manufacture including a commander equipment, wherein the commander equipment may realize the functions specified in one or more flows of the flow chart and one or more blocks in the block diagram Such computer program instructions may also be loaded to a computer or other programmable data processing devices, so that a series of operational processes may be executed on the computer or other programmable devices to produce a computer-realized processing, thereby the instructions executed on the computer or other programmable devices may provide a process for realizing the functions specified in one or more flows in the flow chart and/or one or more blocks in the block diagram.

The specific embodiments described above provide a detailed description of the object, technical solution and beneficial effects of the present disclosure. It should be understood that the foregoing is only illustrative of the specific embodiments of the present disclosure and is not intended to limit the scope of the present disclosure. Any modifications, equivalent replacements, improvements, etc. within the spirit and principle of the present disclosure are intended to be included within the scope of the present disclosure.

What is claimed is:

1. A system for placing and collecting traffic cones and traffic cone lanterns, comprising:
   a vehicle on which a loading bay is disposed;
   a first robot arm mounted at the rear part of the vehicle for moving a traffic cone in the loading bay or a traffic cone with a traffic cone lantern from the vehicle to a placement position;
   at least one camera disposed on the vehicle for obtaining an image signal of road traffic marking; and
   a processing unit connected to the first robot arm and at least one camera, and configured to detect position information of the road traffic marking according to the image signal of the road traffic marking, and control movement of the first robot arm according to the position information of the road traffic marking so as to move the traffic cone or the traffic cone with traffic cone lantern in the loading bay to a position outside the vehicle;
   the system further comprising:
   a radar disposed on the vehicle for scanning at least one suspected traffic cone and its positioning signal outside the vehicle,
   wherein the at least one camera is further adapted to obtain an image signal of the at least one suspected traffic cone, and the processing unit is connected to the radar and is further configured to identify the traffic cone from the at least one suspected traffic cone according to the image signal of the at least one suspected traffic cone, determine position information and a relative motion parameter of the identified traffic cone according to the positioning signal, and control movement of the first robot arm according to the position information and the relative motion parameter of the identified traffic cone, thereby collecting the identified traffic cone to the loading bay.

2. The system for placing and collecting traffic cones and traffic cone lanterns according to claim 1, further comprising a second robot arm mounted at the middle part of the vehicle for moving the traffic cone in a stacking and storage area in the vehicle to the loading bay, or for placing the traffic cone lantern in a traffic cone lantern take-up area on the vehicle onto the traffic cone that has been moved to the loading bay.

3. The system for placing and collecting traffic cones and traffic cone lanterns according to claim 2, wherein the at least one camera is further adapted to obtain an image signal of a top of the identified traffic cone in the loading bay, the processing unit is further configured to identify the traffic cone lantern on the identified traffic cone according to the image signal of the top of the identified traffic cone, and the second robot arm is further adapted to move the identified traffic cone lantern to a traffic cone lantern storage area in the vehicle, and then move the identified traffic cone to the stacking and storage area.

4. The system for placing and collecting traffic cones and traffic cone lanterns according to claim 3, further comprising: a traffic cone lantern conveying device for conveying the traffic cone lantern in the traffic cone lantern storage area to the traffic cone lantern take-up area.

5. The system for placing and collecting traffic cones and traffic cone lanterns according to claim 2, wherein the first robot arm comprises a first robotic arm and a first clamp, the first robot arm is mounted at the rear part of the vehicle through a first support frame, the first clamp includes at least one first jaw for clamping the traffic cone; and wherein the second robot arm comprises a second robotic arm and a second clamp, the second robot arm is mounted at the middle part of the vehicle through a second support frame, the second clamp includes at least one second jaw for clamping the traffic cone and also for clamping the traffic cone lantern.

6. The system for placing and collecting traffic cones and traffic cone lanterns according to claim 1, further comprising a display device and an input device respectively connected to the processing unit; and a wireless communication device connected to the processing unit; and an emergency switch connected to the processing unit.

7. A method for placing traffic cones and traffic cone lanterns, comprising:
obtaining an image signal of a road traffic marking;
detecting position information of the road traffic marking according to the image signal of the road traffic marking;
controlling a first robot arm according to the position information of the road traffic marking; and
moving a traffic cone or a traffic cone with a traffic cone lantern in a loading bay on a vehicle to a placement position outside the vehicle;
wherein the step of controlling the first robot arm according to the position information of the road traffic marking, before moving the traffic cone or the traffic cone with traffic cone lantern in the loading bay in the vehicle to the outside of the vehicle, the method further comprises:
controlling a second robot arm to move the traffic cone to a stacking and storage area in the vehicle to the loading bay, and then place the traffic cone lantern from a traffic cone lantern take-up area onto the traffic cone which has been moved to the loading bay.

8. The method of placing traffic cones and traffic cone lanterns according to claim 7, wherein the step of detecting the position information of the road traffic marking according to the image signal of the road traffic marking, comprises:
identifying a sideline of the road traffic marking from the image signal of the road traffic marking;
extracting a sensitive area from the image signal of the road traffic marking according to the sideline of the road traffic marking;
after colour processing of the sensitive area, detecting the colour-processed sensitive area by canny edge detection;
obtaining an edge line of the road traffic marking; and
calculating the position information of the road traffic marking according to the edge line of the road traffic marking.

9. A non-transitory computer-readable storage medium including a computer program stored therein, wherein the computer program is executable by a processor to implement the steps of the method in claim 7.

10. A computer apparatus, comprising a memory; a processor; and a computer program that is stored in the memory and executable by the processor, wherein the processor implements the steps of the method in claim 7 when the computer program is executed.

11. A method for collecting traffic cones and traffic cone lanterns, comprising:
obtaining a positioning signal of at least one suspected traffic cone outside a vehicle by scanning;
obtaining an image signal of the at least one suspected traffic cone;
identifying a traffic cone from the at least one suspected traffic cone according to the image signal of the at least one suspected traffic cone;
determining position information and a relative motion parameter of the identified traffic cone according to the positioning signal; and
controlling a first robot arm to move the identified traffic cone to a loading bay in the vehicle according to the position information and the relative motion parameter of the identified traffic cone;
the method further comprising:
obtaining an image signal of a top of the identified traffic cone that has been moved to the loading bay;
identifying a traffic cone lantern on the identified traffic cone according to the image signal of the top of the identified traffic cone; and
controlling a second robot arm to move the identified traffic cone lantern to a traffic cone lantern storage area in the vehicle, and then move the identified traffic cone that has been moved to the loading bay to a stacking and storage area in the vehicle.

12. The method for collecting traffic cones and traffic cone lanterns according to claim 11, wherein the step of identifying the traffic cone lantern on the identified traffic cone according to the image signal of the top of the identified traffic cone, comprises:
extracting a sensitive area from the image signal of the top of the identified traffic cone;
after colour filtering of the sensitive area, detecting an edge of the colour-filtered sensitive area; and
identifying the traffic cone lantern at the top of the identified traffic cone through evaluation of a shape of the edge of the sensitive area.

* * * * *